(12) United States Patent
Kawai

(10) Patent No.: US 11,054,724 B2
(45) Date of Patent: Jul. 6, 2021

(54) INTERCHANGEABLE LENS AND METHOD OF TRANSMITTING DATA

(71) Applicant: NIKON CORPORATION, Tokyo (JP)

(72) Inventor: Akihiko Kawai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 78 days.

(21) Appl. No.: 16/502,089

(22) Filed: Jul. 3, 2019

(65) Prior Publication Data

US 2020/0026151 A1 Jan. 23, 2020

(30) Foreign Application Priority Data

Jul. 20, 2018 (JP) .............................. JP2018-137268

(51) Int. Cl.
*G03B 17/14* (2021.01)
*H04N 5/225* (2006.01)
*H04N 5/232* (2006.01)

(52) U.S. Cl.
CPC ........... *G03B 17/14* (2013.01); *H04N 5/2254* (2013.01); *H04N 5/23212* (2013.01); *H04N 5/23258* (2013.01); *H04N 5/23287* (2013.01)

(58) Field of Classification Search
CPC ............. H04N 5/2254; H04N 5/23209; H04N 5/23212; H04N 5/23258; H04N 5/23287; G03B 17/14; G03B 17/565; G03B 2206/00
See application file for complete search history.

(56) References Cited

U.S. PATENT DOCUMENTS

| | | | |
|---|---|---|---|
| 2005/0179782 A1 | 8/2005 | Endo | |
| 2007/0086778 A1* | 4/2007 | Tanaka | H04N 5/232411 396/529 |
| 2008/0007644 A1* | 1/2008 | Matsumoto | H04N 5/232123 348/345 |
| 2009/0180770 A1* | 7/2009 | Honjo | H04N 5/23209 396/55 |
| 2009/0245777 A1* | 10/2009 | Shibuno | H04N 5/232123 396/104 |
| 2010/0110278 A1* | 5/2010 | Higurashi | H04N 5/23212 348/361 |
| 2011/0280557 A1* | 11/2011 | Kikuchi | H04N 5/23296 396/79 |

(Continued)

FOREIGN PATENT DOCUMENTS

| | | |
|---|---|---|
| JP | S63-038926 A | 2/1988 |
| JP | H10-068871 A | 3/1998 |

(Continued)

OTHER PUBLICATIONS

Mar. 5, 2019 Japanese Office Action issued in Japanese Patent Application No. 2018-137268.

(Continued)

*Primary Examiner* — Chiawei Chen
(74) *Attorney, Agent, or Firm* — Oliff PLC

(57) ABSTRACT

An interchangeable lens that is removably attachable to a camera body includes: a moving member that is movable within the interchangeable lens; a first communication unit that performs first communication with the camera body; and a second communication unit that performs second communication in which data is periodically transmitted to the camera body; wherein: the data transmitted in the second communication includes first information indicating a position of the moving member and second information that can be used for calculation of a movement amount of the moving member.

14 Claims, 12 Drawing Sheets

(56) References Cited

U.S. PATENT DOCUMENTS

| | | | |
|---|---|---|---|
| 2011/0317061 A1 | 12/2011 | Imafuji et al. | |
| 2011/0317990 A1 | 12/2011 | Imafuji | |
| 2012/0063016 A1* | 3/2012 | Imafuji | ................. G03B 17/14 |
| | | | 359/822 |
| 2013/0077954 A1 | 3/2013 | Oikawa et al. | |
| 2017/0099428 A1* | 4/2017 | Okuyama | .......... H04N 5/23245 |
| 2017/0289425 A1 | 10/2017 | Takanashi et al. | |
| 2018/0348605 A1* | 12/2018 | Fujihashi | ............. G03B 17/566 |

FOREIGN PATENT DOCUMENTS

| | | |
|---|---|---|
| JP | H11-064956 A | 3/1999 |
| JP | 2000-105402 A | 4/2000 |
| JP | 2005-260913 A | 9/2005 |
| JP | 2010-237514 A | 10/2010 |
| JP | 2011-180302 A | 9/2011 |
| JP | 2012-013779 A | 1/2012 |
| JP | 2012-032761 A | 2/2012 |
| JP | 2013-015568 A | 1/2013 |
| JP | 2015-075664 A | 4/2015 |
| JP | 2017-181838 A | 10/2017 |

OTHER PUBLICATIONS

Jun. 11, 2019 Japanese Office Action issued in Japanese Patent Application No. 2018-137268.
Dec. 17, 2019 Extended European Search Report issued in European Patent Application No. 19186271.3.

* cited by examiner

FIG. 7

FIRST DATA 91

| DATA | DATA CONTENT |
|---|---|
| 91a | FOCUSING LENS POSITIONAL INFORMATION |
| 91b | RELIABILITY OF POSITIONAL INFORMATION |
| 91c | MOVEMENT STATE OF FOCUSING LENS |
| 91d | DESIGEND POSITION |
| 91e | OPERATION STATE OF OPERATING MEMBER |
| 91f | OPERATION STATUS |

FIG. 9

SECOND DATA 92

| DATA | DATA CONTENT |
|---|---|
| 92a | LENS-SIDE ANGULAR SHAKE STATE (X AXIS) |
| 92b | LENS-SIDE ANGULAR SHAKE STATE (Y AXIS) |
| 92c | LENS-SIDE TRANSLATIONAL SHAKE STATE (X AXIS) |
| 92d | LENS-SIDE TRANSLATIONAL SHAKE STATE (Y AXIS) |
| 92e | VALIDITY/INVALIDITY INFORMATION (X AXIS) |
| 92f | VALIDITY/INVALIDITY INFORMATION (Y AXIS) |
| 92g | SHAKE CORRECTION LENS MOVEMENT STATE |
| 92h | SHAKE CORRECTION LENS POSITION (X AXIS) |
| 92i | SHAKE CORRECTION LENS POSITION (Y AXIS) |
| 92j | LENS-SIDE SHAKE CORRECTION AMOUNT (X AXIS) |
| 92k | LENS-SIDE SHAKE CORRECTION AMOUNT (Y AXIS) |
| 92l | LENS-SIDE TOTAL SHAKE AMOUNT (X AXIS) |
| 92m | LENS-SIDE TOTAL SHAKE AMOUNT (Y AXIS) |
| 92n | LENS-SIDE RESIDUAL SHAKE AMOUNT (X AXIS) |
| 92o | LENS-SIDE RESIDUAL SHAKE AMOUNT (Y AXIS) |

INTERCHANGEABLE LENS AND METHOD OF TRANSMITTING DATA

INCORPORATION BY REFERENCE

The disclosure of the following priority application is herein incorporated by reference: Japanese Patent Application No. 2018-137268 filed Jul. 20, 2018.

TECHNICAL FIELD

The present invention relates to an interchangeable lens and method of transmitting data.

BACKGROUND ART

A technique of transmitting information indicating states of an interchangeable lens to a camera body is known (see PTL1). However, if the transmitted information is inappropriate, the control using the transmitted information will be less accurate.

CITATION LIST

Patent Literature

PTL1: Japanese Patent Application Laid-Open No. 2000-105402

SUMMARY OF INVENTION

An interchangeable lens, according to the 1st aspect, that is removably attachable to a camera body, comprising: a moving member that is movable within the interchangeable lens; a first communication unit that performs first communication with the camera body; and a second communication unit that performs second communication in which data is periodically transmitted to the camera body; wherein: the data transmitted in the second communication includes first information indicating a position of the moving member and second information that can be used for calculation of a movement amount of the moving member.

A method of transmitting data, according to the 2nd aspect, in an interchangeable lens that is removably attachable to a camera body, the interchangeable lens having therein a moving member that is movable, the method includes: performing first communication with the camera body; and performing second communication to periodically transmit data to the camera body, wherein: the data transmitted in the second communication includes first information indicating a position of the moving member, and second information that can be used for calculation of a movement amount of the moving member.

BRIEF DESCRIPTION OF DRAWINGS

FIG. 7 is a diagram illustrating information included in hotline data.
FIG. 9 is a diagram illustrating information included in hotline data.

DESCRIPTION OF EMBODIMENTS

Hereinafter, an embodiment of the present invention will be described with reference to the drawings.

Figure 1:
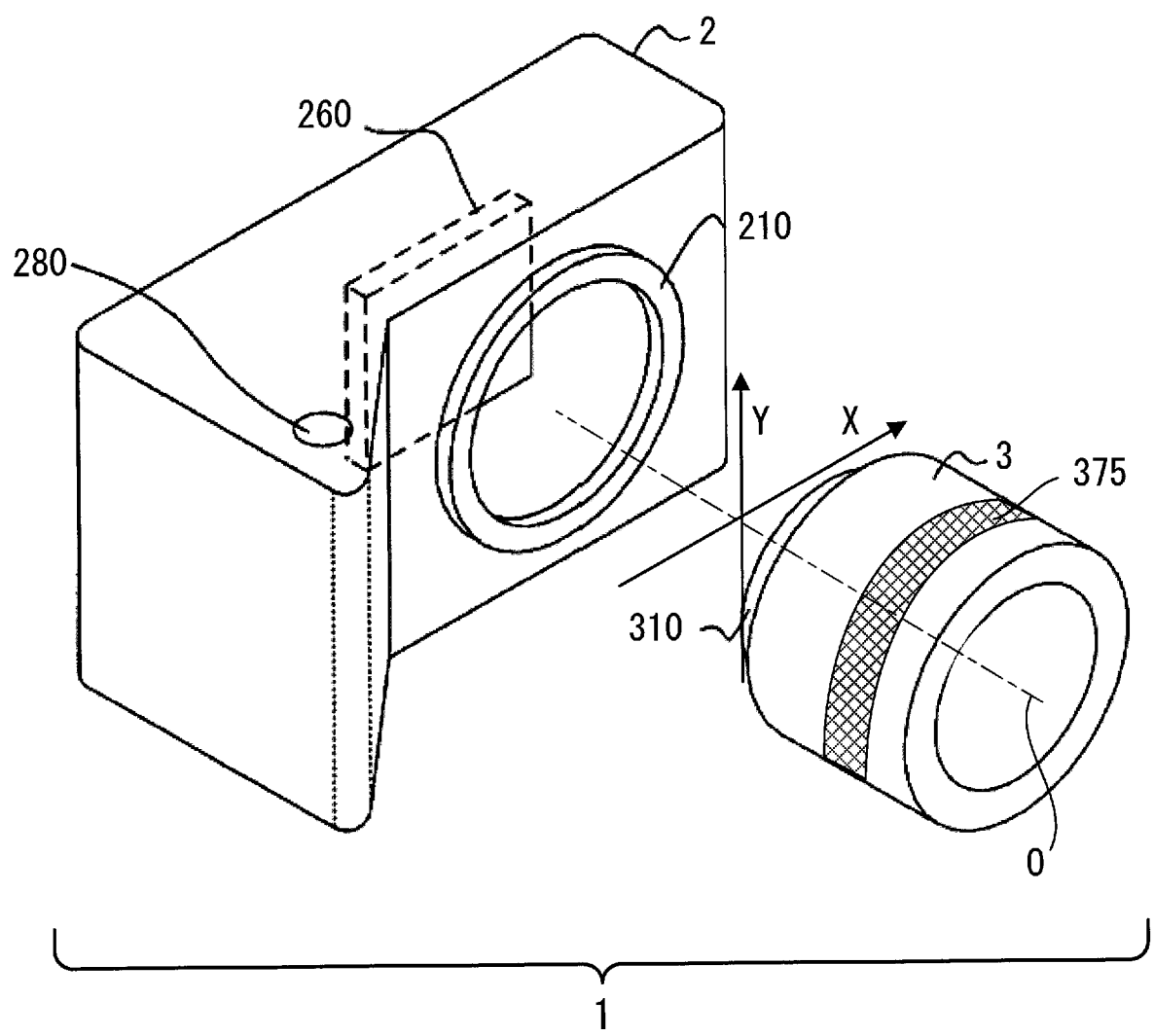
FIG. 1 is a perspective view illustrating a camera system.
Figure 2:
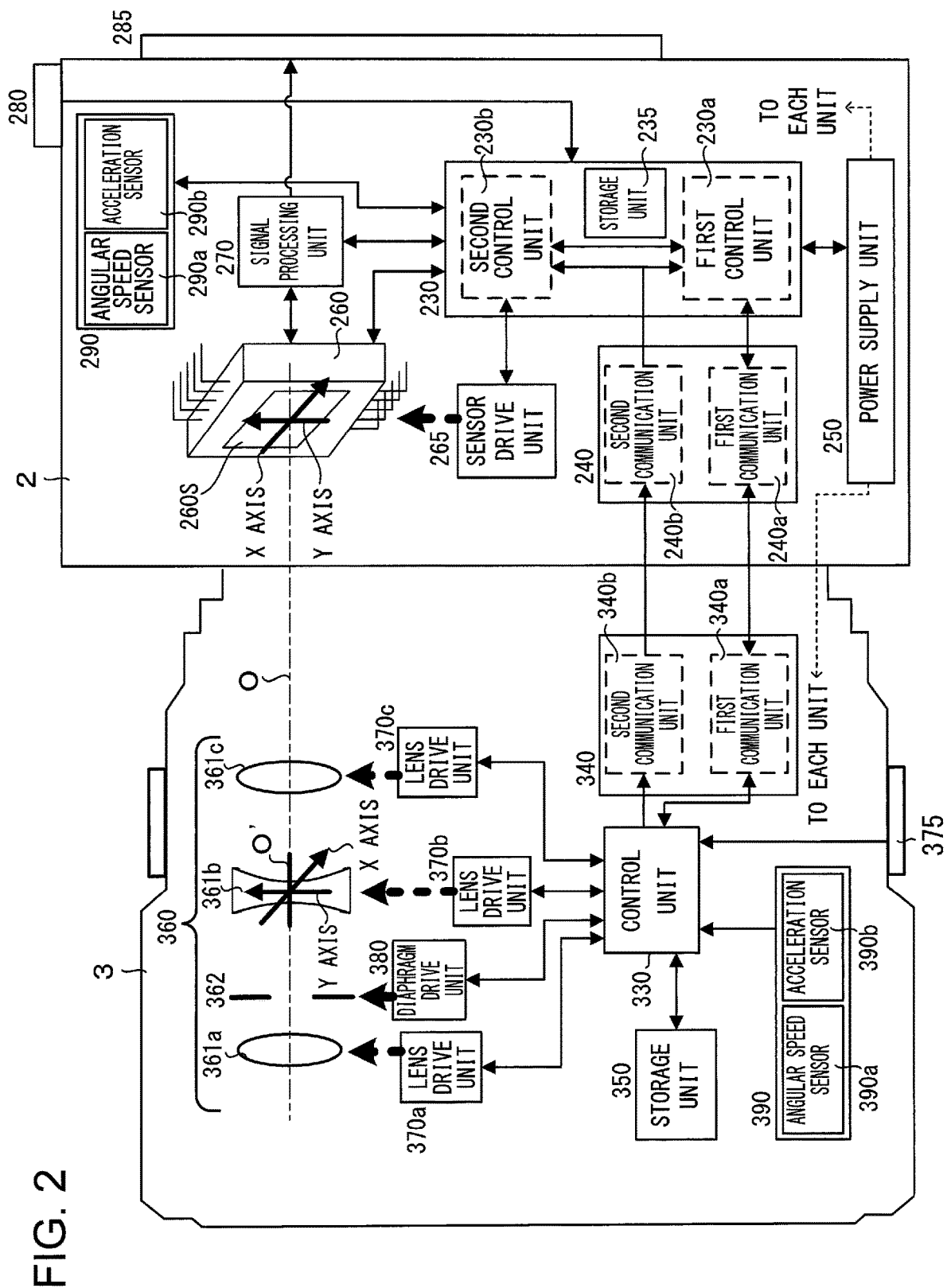
FIG. 2 is a block diagram for explaining main configurations of the camera system.

FIG. 1 is a perspective view of a camera system 1 before an interchangeable lens 3 is attached to a camera body 2 according to an embodiment of the present invention. FIG. 2 is a block diagram for explaining main components of the camera system 1. The camera body 2 and the interchangeable lens 3 are coupled by a bayonet structure composed of a body-side mount 210 and a lens-side mount 310. When the camera body 2 and the interchangeable lens 3 are coupled, a terminal provided on the body-side mount and a terminal provided on the lens-side mount are in physical contact with each other and are electrically connected to each other. Further, in FIG. 1, an optical axis O of the interchangeable lens 3, and an X-axis direction and a Y-axis direction in a plane intersecting the optical axis O are indicated by arrow lines.

Camera Body

The camera body 2 includes a body-side mount 210, a body-side control unit 230, a body-side communication unit 240, a power supply unit 250, an image sensor 260, a sensor drive unit 265, a signal processing unit 270, an operation member 280, a display unit 285, and a shake sensor 290.

Figure 3:
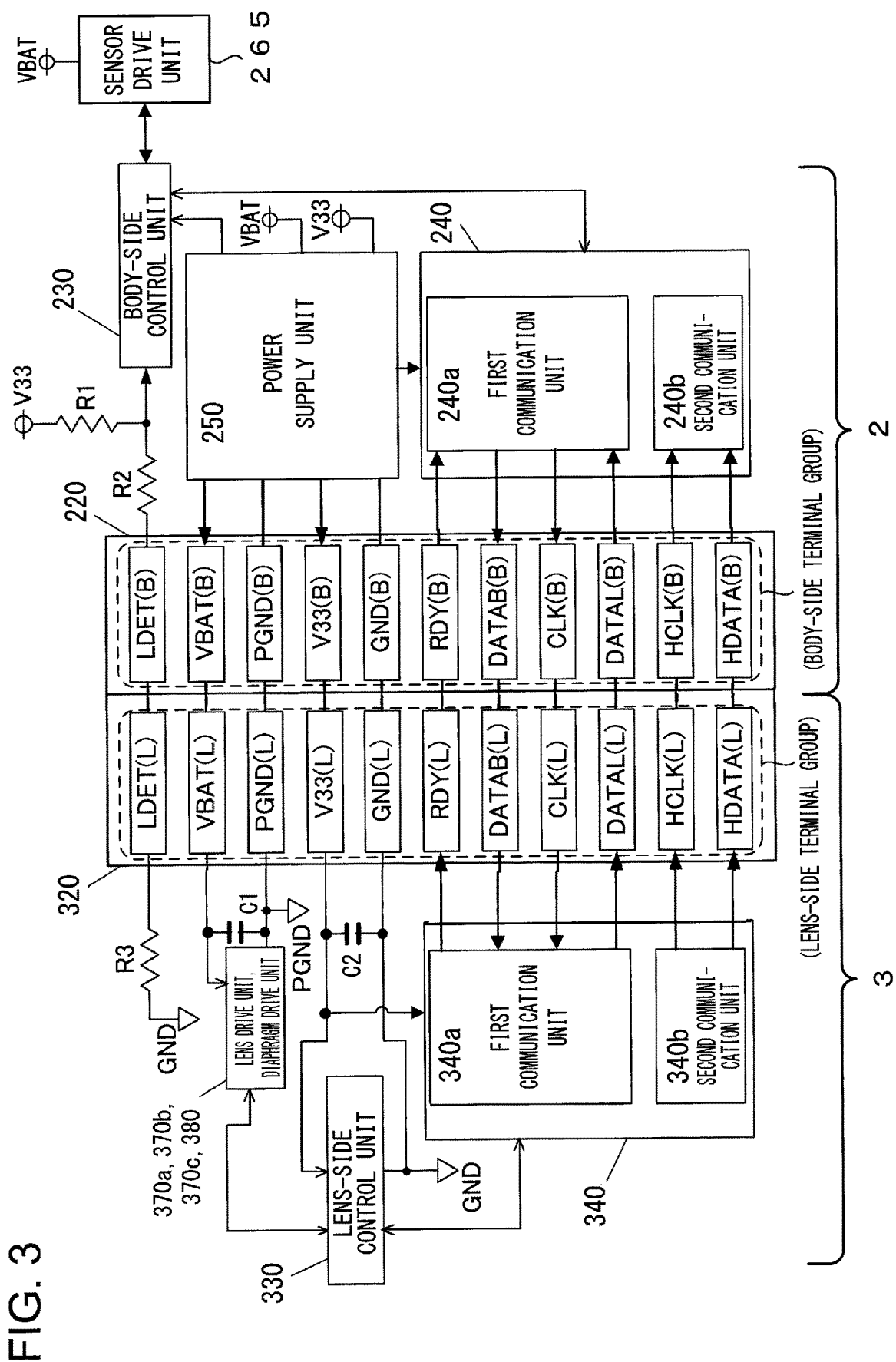
FIG. 3 is a circuit diagram schematically showing an electrical connection between the camera body and the interchangeable lens.

The annular body-side mount 210 is provided with a body-side terminal holding unit 220 (FIG. 3). The body-side terminal holding unit 220 has a plurality of body-side terminals. Examples of the plurality of body-side terminals include: an attachment detection terminal for transmitting, to the camera body 2, a signal indicating that the interchangeable lens 3 has been attached to the camera body 2; a communication terminal used in communication between the camera body 2 and the interchangeable lens 3; a power supply terminal through which power is supplied from the camera body 2 to the interchangeable lens 3; and a ground terminal.

The body-side control unit 230 includes a microcomputer, its peripheral circuits, and the like. The body-side control unit 230 executes control programs stored in a storage unit 235 to control the units in the camera body 2. The body-side control unit 230 is connected to the body-side communication unit 240, the power supply unit 250, the image sensor 260, the sensor drive unit 265, the signal processing unit 270, the operation member 280, the display unit 285, the shake sensor 290, and the above-described attachment detection terminal.

The body-side control unit 230 includes the storage unit 235. Recording and reading of data to/from the storage unit 235 are controlled by the body-side control unit 230. The storage unit 235 stores the control programs executed by the body-side control unit 230 and the like.

The body-side control unit 230 includes a body-side first control unit 230a and a body-side second control unit 230b. The body-side first control unit 230a controls the entire camera body 2 (for example, image processing) and creates instructions to moving members included in the interchangeable lens 3. The body-side second control unit 230b is connected to the shake sensor 290 and the sensor drive unit 265 and mainly controls a shake correction operation in the camera body 2. The body-side second control unit 230b mainly controls the sensor drive unit 265, so that a control for shake correction can be quickly performed. The body-side first control unit 230a transmits an instruction for shake correction, such as a shake correction start, to the body-side second control unit 230b. The body-side first control unit 230a and the body-side second control unit 230b mutually transmit and receive necessary data and instructions, as required.

The body-side communication unit 240 performs predetermined communication with the lens-side communication unit 340. The body-side communication unit 240 is connected to the above-described communication terminal, and transmits a signal to the body-side control unit 230. The body-side communication unit 240 includes a body-side first communication unit 240a and a body-side second communication unit 240b. The body-side first communication unit 240a is connected to a terminal for performing command data communication (described later), and the body-side second communication unit 240b is connected to a terminal for performing hotline communication (described later).

The body-side first communication unit 240a is connected to the body-side first control unit 230a. Information transmitted from the camera body 2 to the interchangeable lens 3 in the command data communication is created by the body-side first control unit 230a. The body-side second communication unit 240b is connected to the body-side first control unit 230a and the body-side second control unit 230b. Information transmitted from the interchangeable lens 3 to the camera body 2 in hotline communication is transmitted to the body-side first control unit 230a and the body-side second control unit 230b.

The power supply unit 250 converts a voltage of a battery (not shown) into voltages used in the units of the camera system 1 and supplies the voltages to the units of the camera body 2 and the interchangeable lens 3. The power supply unit 250 can switch the power supply on and off for each power supply destination according to an instruction of the body-side control unit 230. The power supply unit 250 is connected to the above-described power supply terminal.

The image sensor 260 is, for example, a solid-state image sensor such as a CMOS image sensor or a CCD image sensor. The image sensor 260 performs a photoelectric conversion of a subject image on an image-capturing surface 260S according to a control signal from the body-side control unit 230, and then outputs a signal.

The image sensor 260 includes a photoelectric conversion unit for image generation and a photoelectric conversion unit for focus detection. An image-capturing pixel signal generated by the photoelectric conversion unit for image generation is used by the signal processing unit 270 to generate image data. Additionally, a detection pixel signal generated by the photoelectric conversion unit for focus detection is used by the signal processing unit 270 to perform focus detection processing for detecting a state of image-forming performed by the interchangeable lens 3, in other words, the focal point of the interchangeable lens 3.

The signal processing unit 270 performs predetermined image processing on the image-capturing pixel signal output from the image sensor 260 to generate image data. The generated image data is recorded in a predetermined file format in a storage medium (not shown) or used for image display in the display unit 285. Further, the signal processing unit 270 performs predetermined focus detection processing on the detection pixel signal output from the image sensor 260 to calculate a defocus amount. The signal processing unit 270 is connected to the body-side control unit 230, the image sensor 260, and the display unit 285.

The shake sensor 290 detects shake of the camera body 2 due to camera shake or the like. The shake sensor 290 includes an angular speed sensor 290a and an acceleration sensor 290b. The shake sensor 290 separately detects X-axis direction components and Y-axis direction components of an angular shake and a translational shake.

The angular speed sensor 290a detects an angular speed generated by rotational movement of the camera body 2. The angular speed sensor 290a individually detects a rotation about an axis parallel to the X axis, and a rotation about an axis parallel to the Y axis, for example. The angular speed sensor 290a then outputs a detection signal for the X-axis direction, and a detection signal for the Y-axis direction to the body-side second control unit 230b.

Further, the acceleration sensor 290b detects an acceleration generated by translational movement of the camera body 2. The acceleration sensor 290b individually detects an acceleration in an axis direction parallel to the X axis and an acceleration in an axial direction parallel to the Y axis, for example. The acceleration sensor 290b outputs a detection signal in the X-axis direction and a detection signal in the Y-axis direction to the body-side second control unit 230b.

The angular speed sensor 290a and the acceleration sensor 290b can periodically output the detection signals at an interval shorter than an interval of the hotline communication.

The sensor drive unit 265 includes, for example, an actuator and a drive mechanism. The sensor drive unit 265 moves the image sensor 260 in a direction intersecting the optical axis O based on an instruction output from the body-side second control unit 230b. The movement of the image sensor 260 in a direction intersecting the optical axis O can reduce a shake of a subject image (an image shake) on the image-capturing surface 260S of the image sensor 260. The sensor drive unit 265 also includes a Hall element for detecting a position of the image sensor 260 in a direction intersecting the optical axis O.

The operation member 280 including a release button, an operation switch, and the like is provided on an exterior surface of the camera body 2. A user operates the operation member 280 to issue a photographing instruction, an instruction for setting photographing conditions, and the like. The operation member 280 sends an operation signal according to the user operation, to the body-side control unit 230.

The display unit 285 includes a liquid crystal display panel, for example. The display unit 285 displays an image based on the image data processed by the signal processing unit 270, an operation menu screen, and the like according to an instruction from the body-side control unit 230.

Interchangeable Lens

The interchangeable lens 3 includes a lens-side mount 310, a lens-side control unit 330, a lens-side communication unit 340, a lens-side storage unit 350, an image-capturing optical system 360, a lens drive unit 370, a zoom operation ring 375, a diaphragm drive unit 380, and a shake sensor 390.

The annular lens-side mount 310 is provided with a lens-side terminal holding unit 320 (FIG. 3). The lens-side terminal holding unit 320 has a plurality of lens-side terminals in an arc shape about the optical axis O. As shown in FIG. 3, examples of the plurality of lens-side terminals include: an attachment detection terminal for transmitting, to the camera body 2, a signal indicating that the interchangeable lens 3 has been attached to the camera body 2; a communication terminal used in communication between the interchangeable lens 3 and the camera body 2; a power supply terminal through which power is supplied from the camera body 2 to the interchangeable lens 3; and a ground terminal.

The lens-side control unit 330 includes a microcomputer, its peripheral circuits, and the like. The lens-side control unit 330 executes control programs stored in a lens-side storage unit 350 to control the units in the interchangeable lens 3. The lens-side control unit 330 is directly or indirectly connected to the lens-side communication unit 340, the lens-side storage unit 350, the lens-side drive unit 370, the zoom operation ring 375, the diaphragm drive unit 380, and the shake sensor 390.

The lens-side storage unit 350 includes a non-volatile storage medium. Recording and reading of data to/from the lens-side storage unit 350 are controlled by the lens-side control unit 330. The lens-side storage unit 350 can store data indicating a model name of the interchangeable lens 3, data indicating optical characteristics of the image-capturing optical system 360, and the like, in addition to the control programs executed by the lens-side control unit 330 and the like. Examples of the optical characteristics include a stabilization factor according to a focal length and a photographing distance, a position of a focusing lens 361a in the optical axis O direction according to a focal length and a photographing distance, and the like.

The image-capturing optical system 360 forms a subject image on an image-forming surface (image-capturing surface 260S). The optical axis O of the image-capturing optical system 360 substantially coincides with the center position of the lens-side mount 310, the body-side mount 210, and the image-capturing surface 260S. At least a part of the image-capturing optical system 360 is configured as moving members that can move their position in the interchangeable lens 3.

The image-capturing optical system 360 includes a focusing lens 361a as a moving member, a shake correction lens 361b as a moving member, a zoom lens 361c as a moving member, and a diaphragm 362, for example.

The lens drive unit 370 is configured to move the moving members and includes lens drive units 370a, 370b, 370c. Each lens drive unit 370 includes an actuator and a drive mechanism, and a position detection unit for the moving members. In the present embodiment, the lens-side control unit 330 periodically creates positional information on each moving member according to signals from the position detection unit and the actuator of the lens drive unit 370. Additionally, the lens-side control unit 330 periodically identifies movement states according to signals from the position detection unit and the actuator of the lens drive unit 370, such as whether or not a moving member is being driven to move, a movement direction of a moving member, whether or not a moving member is stopped. An interval at which positional information on a moving member is created and an interval at which movement states of a moving member is identified can be made shorter than the interval of the hotline communication.

The focusing lens 361a is configured to be movable back and forth in the optical axis O direction by the lens drive unit 370a. A focus position of the image-capturing optical system 360 is adjusted by the movement of the focusing lens 361a. Drive instructions such as a moving direction, a movement amount, a movement speed, and the like of the focusing lens 361a may issued by the body-side control unit 230, or may be issued by the lens-side control unit 330 in consideration of the instructions from the body-side control unit 230. The position of the focusing lens 361a can be detected based on the number of pulses (a movement amount) of a stepping motor and a detection result of an origin detection unit when the stepping motor and the origin detection unit are used for the lens drive unit 370a.

Figure 12B:
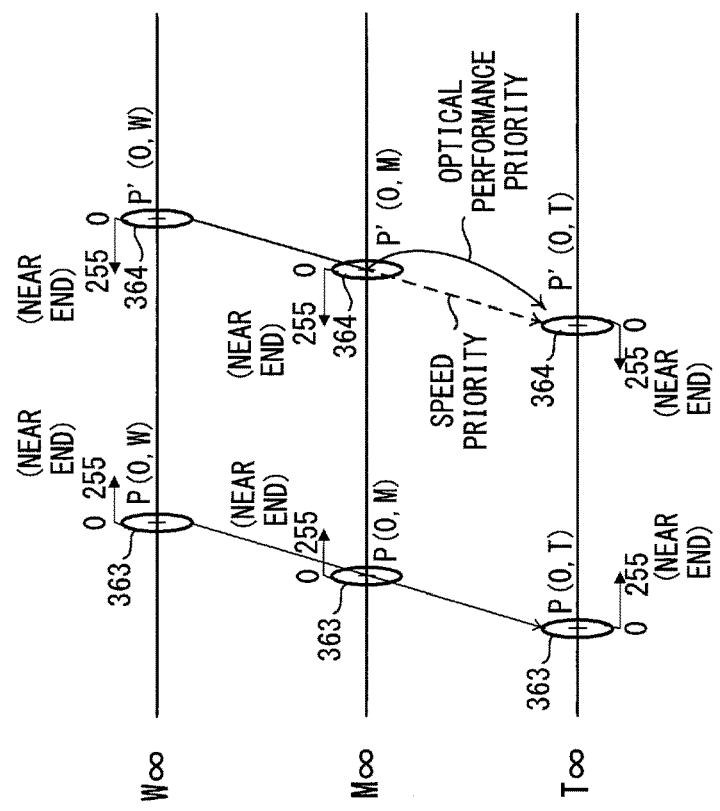
FIG. 12B is a view illustrating a case where a movement trajectory at a time of optical performance priority and a movement trajectory at a time of speed priority partially matches each other.
Figure 12A:
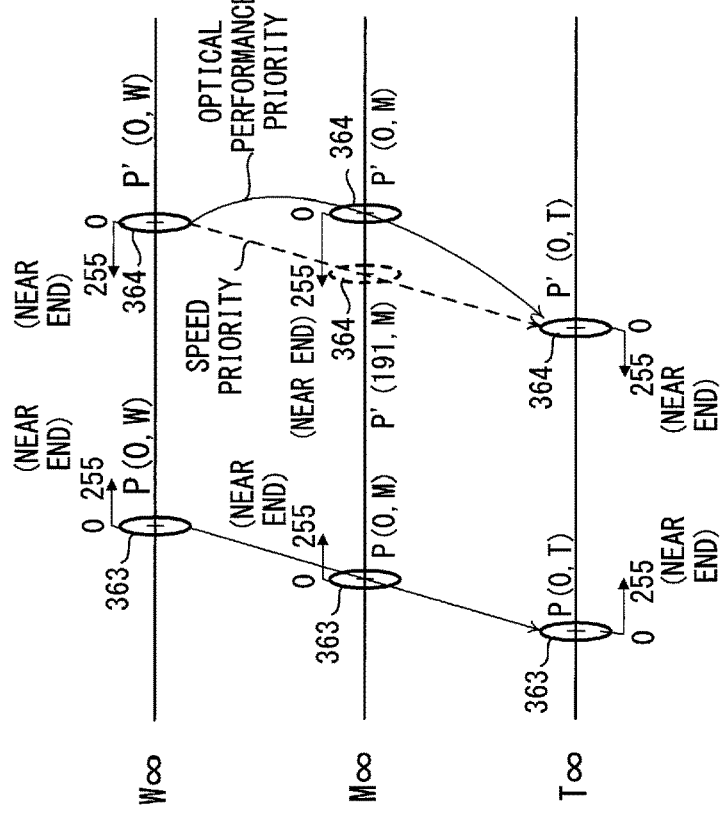
FIG. 12A is a view illustrating movement trajectories of a plurality of focusing lenses.

Although one focusing lens 361a is shown in FIG. 2, the focus position of the image-capturing optical system 360 may be adjusted by moving a plurality of focusing lenses 363, 364 as shown in FIG. 12A. In that case, a plurality of lens drive units 370a may be provided to drive the focusing lenses 363, 364 in the optical axis O direction. FIG. 12A shows positions of the focusing lenses 363, 364 with photographing distances being infinity at focal lengths W, M, T (W<M<T). In FIG. 12A, a position of each focusing lens 363, 364 is denoted by a coordinate in a form of P (numerical value corresponding to photographing distance, symbol corresponding to focal length).

The shake correction lens 361b is configured to be movable back and forth in a direction intersecting the optical axis O by the lens drive unit 370b. The movement of the shake correction lens 361b can reduce a shake of a subject image (an image shake) on the image-capturing surface 260S of the image sensor 260. Drive instructions such as a moving direction, a movement amount, a movement speed, and the like of the shake correction lens 361b may issued by the lens-side control unit 330, or may be issued by the lens-side control unit 330 in consideration of the instructions from the body-side control unit 230. The position of the shake correction lens 361b can be detected by a Hall sensor in the lens drive unit 370b. As positional information on the shake correction lens 361b, the lens drive unit 370b detects a position of the optical axis O' of the shake correction lens 361b in a plane intersecting the optical axis O, for example. That is, a coordinate value in the X-axis direction and a coordinate value in the Y-axis direction of an optical axis O' of the shake correction lens 361b are detected, with the optical axis O as an origin position. Therefore, the positional information on the shake correction lens 361b is represented by the position in the X-axis direction and the position in the Y-axis direction.

The zoom lens 361c is configured to be movable back and forth in the optical axis O direction by the lens drive unit 370c or the zoom operation ring 375. As the zoom lens 361c moves, the focal length of the image-capturing optical system 360 varies. A moving direction, a movement amount, a movement speed, and the like of the zoom lens 361c are instructed by the lens-side control unit 330 or determined by a driving force mechanically transmitted from the zoom operation ring 375. The position of the zoom lens 361c can be detected by an encoder of the lens drive unit 370c or the like.

The diaphragm 362 has a plurality of diaphragm blades as moving members to adjust an amount of light entering the image sensor 260 by the opening formed using the plurality of diaphragm blades. The diaphragm drive unit 380 includes a motor and a diaphragm drive mechanism. Aperture diameter (aperture value) of the diaphragm 362 can be changed by the diaphragm drive unit 380 or by manual operation. The aperture diameter of the diaphragm 362 can be detected by an encoder of the diaphragm drive unit 380 or the like. Positional information on the diaphragm blades as moving members is created as an aperture diameter by the diaphragm drive unit 380 and the lens-side control unit 330.

The zoom operation ring 375 is provided, for example, on an outer cylinder of the interchangeable lens 3. The user performs a zoom operation of changing the focal length of the interchangeable lens 3 by the zoom operation ring 375. An operation signal according to the zoom operation performed by the user can be sent from the zoom operation ring 375 to the lens-side control unit 330.

The shake sensor 390 detects shake of the interchangeable lens 3 due to camera shake or the like. The shake sensor 390 includes an angular speed sensor 390a and an acceleration sensor 390b. The shake sensor 390 separately detects X-axis direction components and Y-axis direction components of an angular shake and a translational shake.

The angular speed sensor 390a detects an angular speed generated by rotational movement of the interchangeable lens 3. The angular speed sensor 390a individually detects a rotation about an axis parallel to the X axis and a rotation about an axis parallel to the Y axis. The angular speed sensor 390a then outputs a detection signal for the X-axis direction and a detection signal for the Y-axis direction to the lens-side control unit 330.

Further, the acceleration sensor 390b detects an acceleration generated by translational movement of the interchangeable lens 3. The acceleration sensor 390b individually detects an acceleration in an axis direction parallel to the X axis and an acceleration in an axial direction parallel to the Y axis, for example. The acceleration sensor 290b outputs a detection signal in the X-axis direction and a detection signal in the Y-axis direction to the lens-side control unit 330.

The angular speed sensor 390a and the acceleration sensor 390b can periodically output the detection signals at an interval shorter than an interval of the hotline communication.

The lens-side communication unit 340 performs predetermined communication with the body-side communication unit 240. The lens-side communication unit 340 is connected to the lens-side control unit 330 and the above-described communication terminal. The lens-side communication unit 340 includes a lens-side first communication unit 340a and a lens-side second communication unit 340b. The lens-side first communication unit 340a is connected to a terminal for performing command data communication (described later), and the lens-side second communication unit 340b is connected to a terminal for performing hotline communication (described later).

The lens-side first communication unit 340a is connected to the lens-side control unit 330. Information transmitted from the interchangeable lens 3 to the camera body 2 in the command data communication is created by the lens-side control unit 330. The lens-side second communication unit 340b is also connected to the lens-side control unit 330. Information transmitted from the interchangeable lens 3 to the camera body 2 in the hotline communication is created by the lens-side control unit 330, the lens-side second communication unit 340b, and the like.

Detailed Description of Terminals

FIG. 3 is a circuit diagram schematically showing an electrical connection between the camera body 2 and the interchangeable lens 3. Arrows denote flows of signals.

The body-side terminal holding unit 220 of the body-side mount 210 includes a LDET(B) terminal, a VBAT(B) terminal, a PGND(B) terminal, a V33(B) terminal, a GND(B) terminal, a RDY(B) terminal, a DATAB(B) terminal, a CLK(B) terminal, a DATAL(B) terminal, a HCLK(B) terminal, and a HDATA(B) terminal, as the body-side terminals described above. These eleven body-side terminals are collectively referred to as a body-side terminal group. The terminals in the body-side terminal group are arranged in a sequence shown in FIG. 3, in an arc form about a central axis of the body-side mount 210, in the body-side terminal holding unit 220.

The lens-side terminal holding unit 320 of the lens-side mount 310 includes a LDET(L) terminal, a VBAT(L) terminal, a PGND(L) terminal, a V33(L) terminal, a GND(L) terminal, a RDY(L) terminal, a DATAB(L) terminal, a CLK(L) terminal, a DATAL(L) terminal, a HCLK(L) terminal, and a HDATA(L) terminal. These eleven lens-side terminals are collectively referred to as a lens-side terminal group. The terminals in the lens-side terminal group are arranged in a sequence shown in FIG. 3, in an arc form about a central axis O, in the lens-side terminal holding unit 220.

The RDY(B) terminal, the DATAB(B) terminal, the CLK(B) terminal, the DATAL(B) terminal, the RDY(L) terminal, the DATAB(L) terminal, the CLK(L) terminal, and the DATAL(L) terminal are communicate terminals, which are used for command data communication. Further, the HCLK(B) terminal, the HDATA(B) terminal, the HCLK(L) terminal, and the HDATA(L) terminal are communication terminals, which are used for hotline communication.

The RDY(B) terminal, the DATAB(B) terminal, the CLK(B) terminal, the DATAL(B) terminal, the HCLK(B) terminal, and the HDATA(B) terminal are connected to the body-side control unit 230 via the body-side communication unit 240. The RDY(L) terminal, the DATAB(L) terminal, the CLK(L) terminal, the DATAL(L) terminal, the HCLK(L) terminal, and the HDATA(L) terminal are connected to the lens-side control unit 330 via the lens-side communication unit 340.

The RDY(B) terminal is an input terminal via which a signal (hereinafter, an RDY signal) indicating whether or not the interchangeable lens 3 is ready for command data communication is input from the RDY(L) terminal. When the lens-side control unit 330 is ready for command data communication, a potential of the RDY signal is changed from L level to H level and then again to L level. When the body-side control unit 230 detects that the potential of the input RDY signal changes from L level to H level and then to L level, the body-side control unit 230 determines that the interchangeable lens 3 is ready for command data communication.

The DATAB(B) terminal is an output terminal via which a data signal (hereinafter, a DATAB signal) is output to the DATAB(L) terminal of the interchangeable lens 3. In the command data communication, the DATAB signal from the body-side first communication unit 240a is input to the lens-side first communication unit 340a.

The DATAL(B) terminal is an input terminal via which a data signal (hereinafter, a DATAL signal) from the DATAL(L) terminal is input. In the command data communication, the DATAL signal from the lens-side first communication unit 340a is input to the body-side first communication unit 240a.

The CLK(B) terminal is an output terminal via which a clock signal (hereinafter, a CLK signal) for command data communication is output to the CLK(L) terminal. The CLK signal from the body-side first communication unit 240a is input to the lens-side first communication unit 340a. The command data communication is bidirectional data communication performed between the camera body 2 and the interchangeable lens 3, where the DATAB signal and the DATAL signal are transmitted and received in synchronization with the CLK signal.

The HCLK(B) terminal is an input terminal via which a clock signal (hereinafter, a HCLK signal) for hotline communication from the HCLK(L) terminal is input.

The HDATA(B) terminal is an input terminal via which a data signal (hereinafter, a HDATA signal) for hotline communication from the HDATA (L) terminal is input.

The hotline communication is one-way data communication from the interchangeable lens 3 to the camera body 2, where the body-side second communication unit 240b receives the HDATA signal in synchronization with the HCLK signal from the lens-side second communication unit 340b.

The LDET(B) terminal is the attachment detection terminal described above. In the camera body 2, the LDET(B) terminal is connected to the body-side control unit 230 via a resistor R2. The resistor R2 and the body-side control unit 230 are connected via a power supply V33 supplied from the power supply unit 250 and a resistor R1.

On the other hand, in the interchangeable lens 3, the LDET(L) terminal is connected (grounded) to a GND potential via a resistor R3. With such a configuration, the LDET (B) terminal is pulled up in the camera body 2 and is at a potential of the power supply V33 in a state where the interchangeable lens 3 is not attached to the camera body 2. When the interchangeable lens 3 is attached to the camera body 2, the LDET(L) terminal at the ground potential is connected to the pulled-up LDET(B) terminal so that the potential of the LDET(B) terminal decreases. Based on this fact, the camera body 2 can detect that the interchangeable lens 3 has been attached thereto.

The VBAT(B) terminal and the V33(B) terminal are power supply terminals for supplying power to the interchangeable lens 3. The VBAT(B) terminal supplies drive system power to the VBAT(L) terminal. The V33(B) terminal supplies circuit system power to the V33(L) terminal. The drive system power is supplied to the lens drive unit 370 and the diaphragm drive unit 380 including an actuator such as a motor. The circuit system power is supplied to the lens-side control unit 330 and the lens-side communication unit 340. In the present embodiment, the drive system power is larger than the circuit system power.

The PGND(B) terminal is a ground terminal corresponding to the VBAT(B) terminal. The PGND(B) terminal is connected to the PGND(L) terminal. The GND(B) terminal is a ground terminal corresponding to the V33(B) terminal. The GND(B) terminal is connected to the GND(L) terminal.

Note that arrows in FIG. 3 denote directions in which powers are supplied and directions in which signals are transmitted.

Detail Description of Communication

The camera system 1 includes two independent communication systems based on the command data communication and the hotline communication, so that the communications can be performed in parallel. That is, the camera body 2 and the interchangeable lens 3 can start or finish the hotline communication while performing the command data communication. The command data communication may be performed while performing the hotline communication. Therefore, the interchangeable lens 3 can continuously transmit data to the camera body 2 in the hotline communication even during the command data communication. For example, even when a time required for the command data communication becomes large due to an increase in a data amount, the hotline communication can be performed at a required timing.

Furthermore, while the camera body 2 is receiving data in the hotline communication, the camera body 2 can also transmit various instructions and requests to the interchangeable lens 3 at a given timing in the command data communication and can receive data from the interchangeable lens 3 at a given timing.

Figure 4:
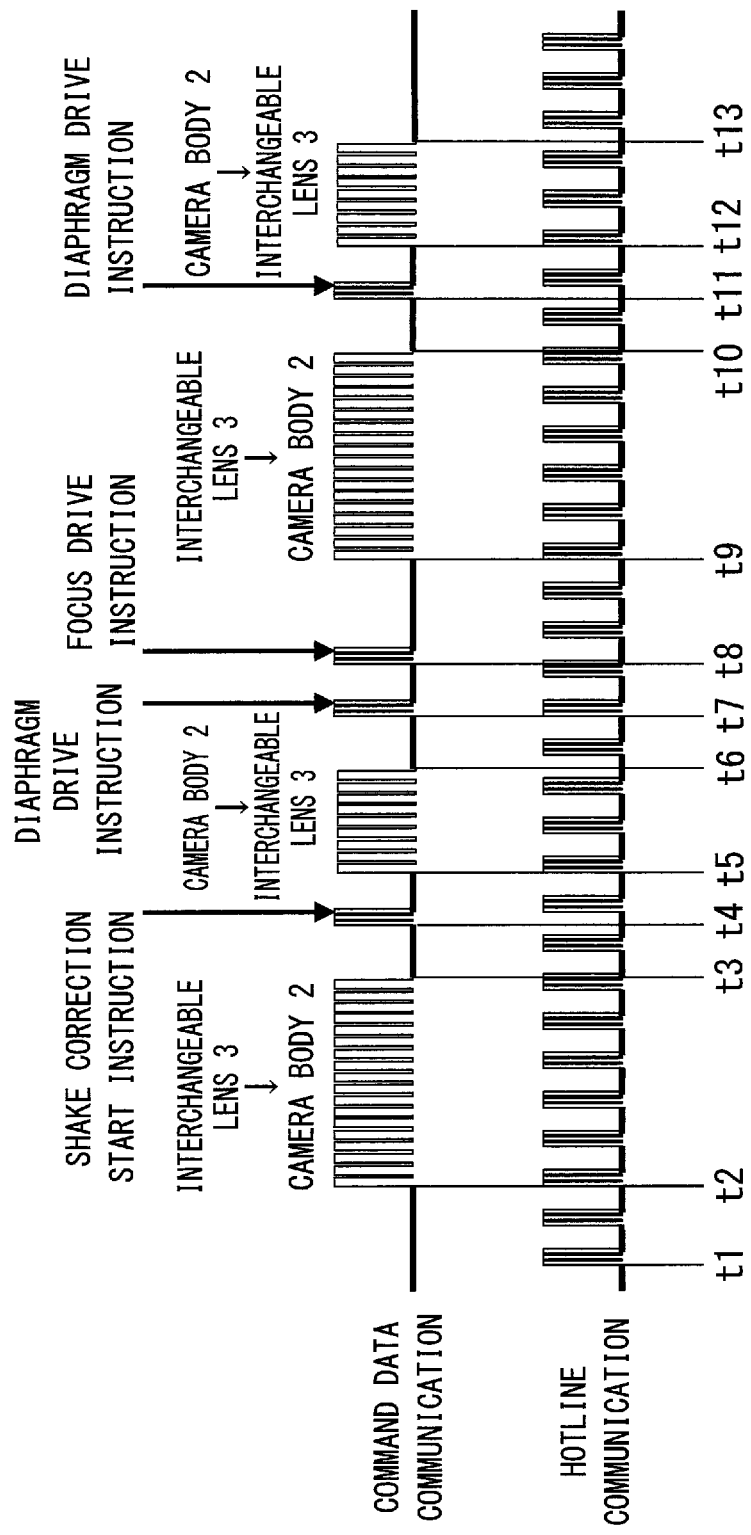
FIG. 4 is a timing chart illustrating command data communication and hotline communication.

FIG. 4 is a timing chart illustrating the command data communication and the hotline communication.

After instructing the start of the hotline communication in the command data communication, the camera body 2 periodically receives data from the interchangeable lens 3 in the hotline communication after time point t1, for example.

The camera body 2 also transmits and receives data to/from the interchangeable lens 3 in the command data communication. Specifically, the camera body 2 receives various types of data transmitted from the interchangeable lens 3 in response to an instruction, between time points t2 and t3 and between time points t9 and t10. Then, between time points t5 and t6 and between time points t12 and t13, the camera body 2 transmits various types of data to the interchangeable lens 3. At time points t4, t7, t8, and t11 in between, the camera body 2 transmits instructions relating to movement control of the moving members, such as a shake correction start instruction, a diaphragm drive instruction, and a focus drive instruction, to the interchangeable lens 3.

In the present embodiment, a large number of types of data are transmitted and received and a frequency of instructions to the interchangeable lens 3 is high in the command data communication. Further, depending on types of data, a time required for transmission and reception may become long. Thus, times of transmitting and receiving various types of data between time points t2 and t3, between time points t5 and t6, between time points t9 and t10, and between time points t12 and t13 may be longer than times of transmitting instructions at times points t4, t7, t8, and W.

In response to an instruction from the camera body 2 sent in the command data communication, for example, the interchangeable lens 3 transmits data indicating information on the interchangeable lens 3 (such as a focal length, a photographing distance, or an aperture value), to the camera body 2. The interchangeable lens 3 further receives data indicating information on the camera body 2 (such as a frame rate, a setting of the camera body 2, whether or not moving-image recording is in progress), which is transmitted from the camera body 2.

In the command data communication, a time required for one transmission and reception is long and a frequency of transmission and reception is high. It is therefore difficult to continuously perform data communication at a short interval.

On the other hand, in the hotline communication, data communication from the interchangeable lens 3 to the camera body 2 can be continuously performed at a short interval because a communication terminal used for the hotline communication is different from the communication terminal used for the command data communication. For example, the hotline communication can be performed in a desired time period from completion of an activation process of the camera body 2 to a blocking process, including an exposure period.

A start instruction and an end instruction for the hotline communication are transmitted from the camera body 2 to the interchangeable lens 3 in the command data communication. However, this is not limiting.

Description of Command Data Communication

Figure 5:
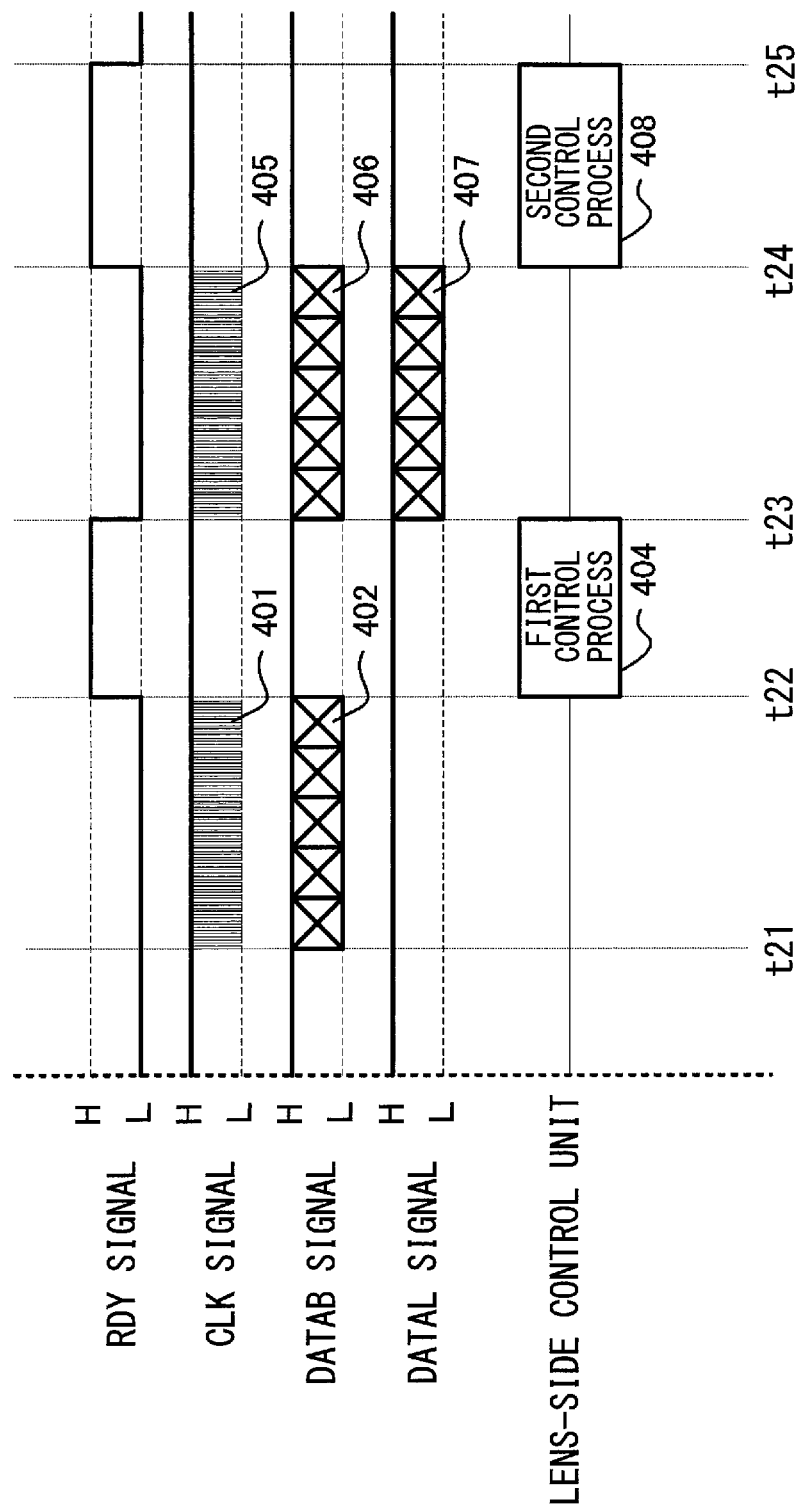
FIG. 5 is a diagram illustrating a timing of the command data communication.

Next, the command data communication will be described with reference to FIG. 5. FIG. 5 illustrates a timing of the RDY signal, the CLK signal, the DATAB signal, and the DATAL signal.

In one command data communication, after one command packet 402 is transmitted from the camera body 2 to the interchangeable lens 3, data packets 406, 407 (one packet from the camera body 2, the other packet from the interchangeable lens 3) are transmitted and received between the camera body 2 and the interchangeable lens 3.

The lens-side first communication unit 340*a* sets a potential of the RDY signal to L level at the start of the command data communication (t21). When the RDY signal is at L level, the body-side first communication unit 240*a* starts outputting a CLK signal 401. A frequency of the CLK signal 401 is 8 MHz, for example. The body-side first communication unit 240*a* outputs a DATAB signal including the command packet 402 having a predetermined length, in synchronization with the clock signal 401. The command packet 402 is indicated by switching between H level and L level. After outputting the CLK signal 401 for a time period corresponding to the data length of the command packet 402, the body-side first communication unit 240*a* ends the output of the CLK signal (t22).

The command packet 402 includes, for example, data for synchronization, data for identifying which number of command data communication, data indicating an instruction from the camera body 2, data indicating a data length of a subsequent data packet 406, data for communication error check. The instructions included in the command packet 402 include, for example, a drive instruction for the moving members from the camera body 2 to the interchangeable lens 3, a data transmission instruction from the camera body 2 to the interchangeable lens 3, and the like.

The interchangeable lens 3 may determine the presence or absence of a communication error based on whether or not a value calculated from the received command packet 402 matches the data for communication error check included in the command packet 402.

Once the reception of the command packet 402 has been completed, the lens-side first communication unit 340*a* sets the RDY signal to H level and the lens-side control unit 330 starts a first control process 404 based on the command packet 402 (t22).

Once the first control process 404 by the lens-side control unit 330 has been completed, the lens-side first communication unit 340*a* can set the RDY signal to L level (t23). The body-side first communication unit 240*a* outputs a CLK signal 405 when the input RDY signal becomes L level.

The body-side first communication unit 240*a* outputs a DATAB signal including the data packet 406, in synchronization with the CLK signal 405. The lens-side first communication unit 340*a* outputs a DATAL signal including the data packet 407 having a predetermined length, in synchronization with the CLK signal 405. The data packets 406, 407 are indicated by switching between H level and L level. After outputting the CLK signal 405 for a time period corresponding to the data length of the data packet 406, the body-side first communication unit 240*a* ends the output of the CLK signal (t24).

Data packets 406, 407 are m-byte variable-length data having the number of data specified by the command packet 402. The data packets 406, 407 includes, for example, data for synchronization, data indicating information on the camera body 2, data indicating information on the interchangeable lens 3, and data for communication error check.

The data packet 406 transmitted from the camera body 2 to the interchangeable lens 3 includes data indicating drive amounts of the moving members, data for transmitting settings and operation states in the camera body 2, and the like.

The data packet 407 transmitted from the interchangeable lens 3 to the camera body 2 includes data indicating information on a model name of the interchangeable lens 3, data indicating movement states of the moving members in the interchangeable lens 3, and data on optical characteristics such as a focal length of the interchangeable lens 3.

A receiving device (the interchangeable lens 3 or the camera body 2) may determine the presence or absence of a communication error based on whether or not a value calculated from the received data packets 406, 407 matches the data for communication error check included in the data packets 406, 407.

Once the reception of the data packets 406, 407 has been completed, the lens-side first communication unit 340*a* sets the RDY signal to H level and the lens-side control unit 330 starts a second control process 408 based on the data packet 406, 407 (t24).

Description of First and Second Control Processes

Next, an example of the first control process 404 and the second control process 408 of the command data communication will be described.

For example, it is assumed that the command packet 402 includes a drive instruction of the focusing lens 361*a*. As the first control process 404, the lens-side control unit 330 generates a data packet 407 indicating that the drive instruction for the focusing lens 361*a* has been received.

Next, as the second control process 408, the lens-side control unit 330 instructs the lens drive unit 370*a* to move the focusing lens 361*a* by a movement amount indicated by the data packet 406. Thus, movement of the focusing lens 361*a* in the optical axis O direction is started. When the lens-side control unit 330 instructs the lens drive unit 370*a* to move the focusing lens 361*a*, the first lens communication unit 340*a* regards that the second control process 408 is completed, and sets the RDY signal to L level (t25).

Further, for example, it is assumed that the command packet 402 includes an instruction of starting hotline communication. As the first control process 404, the lens-side control unit 330 generates a data packet 407 indicating that an instruction of starting the hotline communication is received. Next, as a second control process 408, the lens-side control unit 330 causes the lens-side second communication unit 340*b* to start hotline communication. When the lens-side control unit 330 instructs a start of the hotline communication, the lens-side control unit 330 regards that the second control process 408 is completed, and sets the RDY signal to L level (t25).

Description of Hotline Communication

Figure 6:
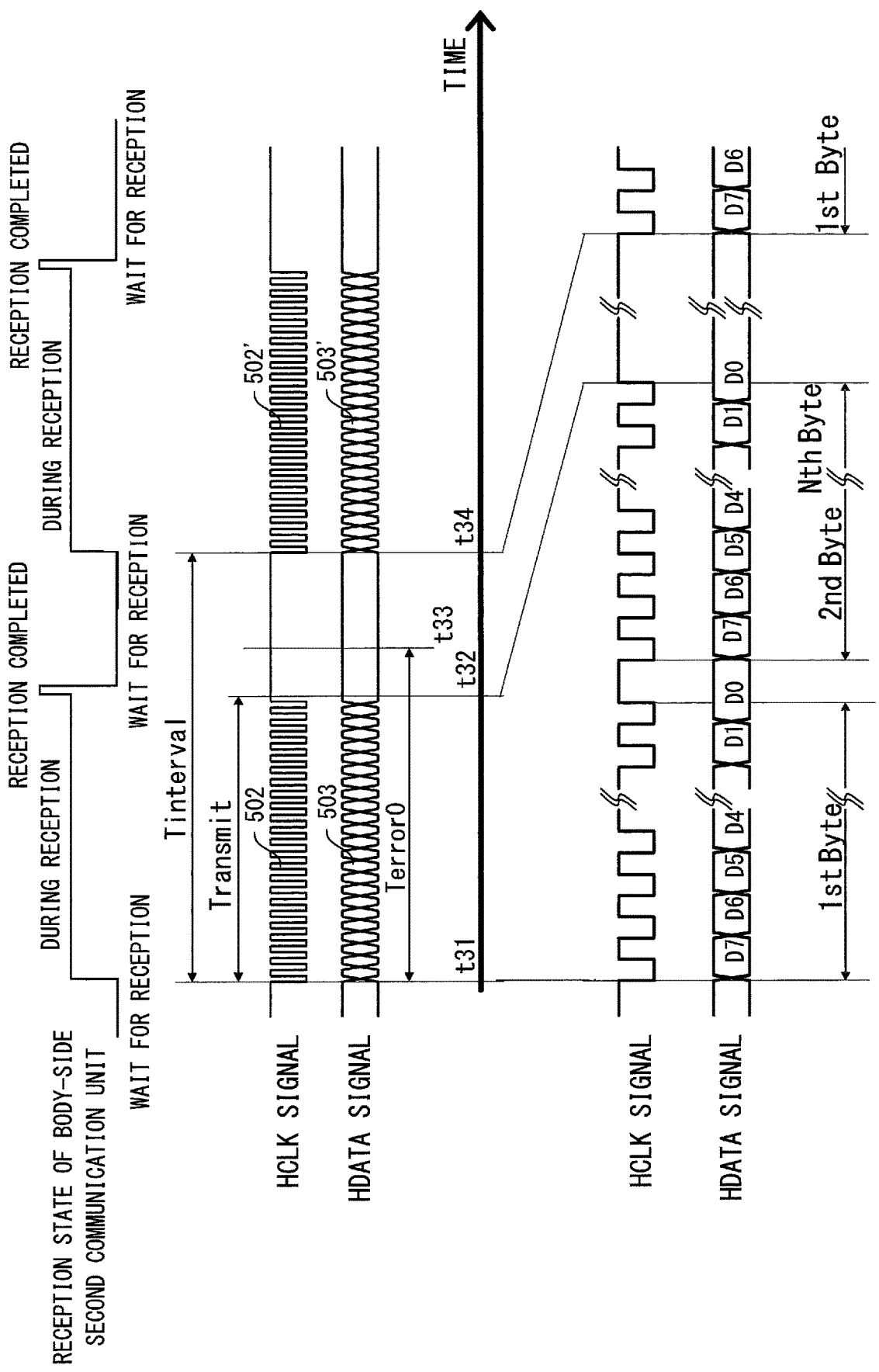
FIG. 6 is a diagram illustrating a timing of the hotline communication.

Next, the hotline communication will be described with respect to FIG. 6. FIG. 6 illustrates a timing of the HCLK signal and the HDATA signal. In one hotline communication, one HDATA signal 503 is transmitted from the interchangeable lens 3 to the camera body 2 in synchronization with one HCLK signal 502.

In the camera system 1 according to the present embodiment, information on agreements for the hotline communication is determined between the interchangeable lens 3 and the camera body 2 before sending and receiving the instruction of starting the hotline communication. The information on agreements for the hotline communication includes, for example, a data length (the number of bytes) of a HDATA signal to be transmitted in one hotline communication, data to be included in the HDATA signal and an order of data, a clock frequency of the HCLK signal, an interval (Tinterval in FIG. 6), a communication time in one interval (Ttransmit in FIG. 6), and the like. In the present embodiment, a frequency of the HCLK signal is 2.5 MHz, a data length of one hotline communication is longer than that of the command packet 402, an interval of one hotline communication is 1 millisecond, and a communication time in one interval is less than 75% of a transmission interval. However, this is not limiting. Note that one hotline communication, which means data transmission performed in one interval of the hotline communication, is different from a period from the hotline communication start instruction to the hotline communication end instruction from the camera body 2 in the command data communication.

First, an operation of the lens-side second communication unit 340b in the hotline communication will be described. When the instruction of starting the hotline communication is received in the command data communication before time point t31, the second lens-side communication unit 340b starts outputting a HCLK signal to the camera body 2 (t31). The HCLK signal is periodically output from the interchangeable lens 3 and shown in FIG. 6 as HCLK signals 502, 502', . . . .

The lens-side second communication unit 340b outputs a HDATA signal in synchronization with the HCLK signal. The HDATA signal is indicated by switching between H level and L level. One HDATA signal has a predetermined data length and is represented as N×1 byte which includes eight bits D0 to D7 in FIG. 6. One HDATA signal may include any unused bit area and any unused byte area to have a fixed length. A predetermined initial value is input to the unused bit area and the unused byte area. The HDATA signal is periodically output from the interchangeable lens 3 in synchronization with the HCLK signals 502, 502', . . . , and is represented as HDATA signals 503, 503', . . . in FIG. 6.

Once transmission of the HDATA signal has been completed (t32), the lens-side second communication unit 340b stops outputting the HCLK signal until time point t34 when the next transmission of the HDATA signal is started. The period from time point t31 to time point t32 is one hotline communication, and the period from time point t31 to time point t34 is one interval of the hotline communication. The lens-side second communication unit 340b starts a second hotline communication from time point t34.

The lens-side second communication unit 340b periodically continues the hotline communication until the instruction of ending the hotline communication is transmitted from the camera body 2 in the command data communication.

The lens-side second communication unit 340b transmits the HDATA signals 503, 503', . . . to the body-side second communication unit 240b by an integrated serial communication unit. The lens-side second communication unit 340b uses a DMA (Direct Memory Access) function, for example, to efficiently transfer data stored in a data area of a memory (not shown) as an HDATA signal. The DMA function is a function of automatically accessing data on the memory without intervention of a CPU.

Next, an operation of the body-side second communication unit 240b in the hotline communication will be described. In the present embodiment, when an initialization process at a time of power on is completed, or when transmission of a hotline communication start instruction is determined in the command data communication, the second body-side communication unit 240b allows the HDATA(B) terminal and the HCLK(B) terminal to wait and be ready for reception.

When transmission of the HDATA signal is started from the interchangeable lens 3 and reception of data having a predetermined length is completed (t32) before the elapse (time point t33) of a predetermined time period Terror® from the start time point t31, the body-side second communication unit 240b determines that communication of the received data has been successfully performed. The predetermined time period Terror® is a time period obtained by adding a margin to a communication time period Ttransmit in one interval and is 80% of one interval, for example. After receiving the HDATA signal once, the body-side second communication unit 240b continues to allow the HDATA(B) terminal and the HCLK(B) terminal ready to wait and be ready for reception. After one interval is elapsed from time point t31, the body-side second communication unit 240b starts receiving the next HDATA signal (t34).

If reception of data having a predetermined length is not completed within a predetermined time period Terror® since the start of transmission of the HDATA signal by the lens-side second communication unit 340b, the body-side second communication unit 240b discards the received data as "communication was unsuccessful" (communication error).

Note that, in the hotline communication, it is preferable that the communication time period (Ttransmit) in one interval does not exceed 75% so that a communication error process and the like can be performed during each interval (between t33 and t34). However, this is not limiting.

Hotline Data

In one hotline communication, one hotline data 90 is transmitted from the interchangeable lens 3 to the camera body 2.

The hotline data 90 can include at least two types of information for each moving member, that is, positional information on the moving member (hereinafter, first information) and information that may be used to calculate a drive amount of the moving member (hereinafter, second information). In the present embodiment, the hotline data 90 includes first data 91 including first information indicating a position of the focusing lens 361a and second information that may be used to calculate a drive amount of the focusing lens 361a, and second data 92 including first information indicating a position of the shake correction lens 361b and second information that may be used to calculate a drive amount of the shake correction lens 361b. The information included in the first data 91 and the information included in the second data 92 may be the same or partially different. The camera body 2 may calculate the drive amount using the second information, or may calculate the drive amount without using the second information. Additionally, when the interchangeable lens 3 has no shake correction lens 361b, the hotline data 90 may include the first data 91 and not include the second data 92.

The second information can be set for each moving member. For example, the second information includes at least one of a reliability of the positional information, movement states of the moving members, and operation states of the operation members such as the zoom operation ring 375. The above-described information, statuses, and the like are expressed in the form of numerical values and identifiers by the lens-side control unit 330, the lens-side second communication unit 340b, and the like, and are included in the hotline data 90.

Since the hotline data 90 transmitted in one hotline communication includes at least one first information and at least one second information, the camera body 2 can acquire the first information and the second information in one hotline communication. Here, for example, if the first information and the second information are received in separate communications, the camera body 2 is required to match a timing at which the first information is created with a timing at which the second information is created. However, according to the present embodiment, a plurality of types of information can be sent in one hotline communication, so that the camera body 2 can easily take the plurality of types of information into consideration.

Description of First Data 91

FIG. 7 is a view for explaining information included in the first data 91.

The first data 91 includes data 91a on the position of the focusing lens 361a as first information. The first data 91 also includes, as second information, at least one of data 91b on the reliability of the data 91a, data 91c on the movement state of the focusing lens 361a, data 91d on whether or not the focusing lens 361a is located at a designed position, data 91e on the operation states of the operation members, and data 91f on the operation status according to the focusing drive instruction. Here, the second information is information that can be taken into consideration in creating a focus drive instruction in the camera body 2. The second information may be any information as long as it can affect calculation of the drive amount of the focusing lens 361a. Contents of the second information may be changed as appropriate.

The data 91a includes numerical values representing positional information on the focusing lens 361a in the optical axis O direction, which is detected by the lens drive unit 370a. The positional information may be an absolute position of the focusing lens 361a in the optical axis O direction, a relative position such as a movement amount of the focusing lens 361a in the optical axis O direction, or a photographing distance determined from a position of the focusing lens 361a. The data 91a may include a value indicating a current position of the focusing lens 361a, for example, with values from 0 to 255 corresponding to positions from infinity to a near end of the focusing lens 361a at each focal length. The data 91a can also be represented by the number of pulses output from the lens drive unit 370a. Preferably, this allows the data 91a to be easily created. Further, in the case where a plurality of focusing lenses 363, 364 are provided, the data 91a in the present embodiment may be positional information on one virtual lens in consideration of positions of the plurality of focusing lens 363, 364, instead of positional information on one focusing lens selected among the plurality of focusing lens 363, 364. Even when the plurality of focusing lenses 363, 364 are provided, the data length of the hotline data 90 can be fixed regardless of the number of focusing lenses by using positional information on one moving member as the data 91a. Further, this approach has an effect that it is not necessary to transmit the number of focusing lenses to the camera body 2 and it is not necessary to change a control performed by the camera body 2 in accordance with the number of focusing lenses.

The data 91c relates to the movement state of the focusing lens 361a and is represented by, for example, an identifier indicating whether or not the focusing lens 361a is moving, an identifier indicating whether or not the focusing lens 361a is movable, and an identifier indicating a moving direction of the focusing lens 361a.

Data 91d relates to whether the focusing lens 361a is located at a designed position and includes, for example, an identifier indicating whether or not zoom tracking is in progress, and an identifier indicating whether or not the focusing lens 361a is moving along a movement trajectory that gives priority to speed compared with a designed trajectory (a movement trajectory that gives priority to optical performance). The designed position of the focusing lens 361 is, for example, a position in the optical axis O direction that is uniquely determined by a focal length and a photographing distance. Generally, the interchangeable lens 3 is designed to set the position of the focusing lens 361a in the optical axis O direction according to the focal length and the photographing distance in order to achieve desired optical performance. However, in the case where a higher priority is placed on the movement speed of the focusing lens 361a over the optical performance in zoom tracking or initialization operation, for example, the focusing lens 361a moves through positions different from originally set positions and follows a movement trajectory different from a designed movement trajectory. In that case, the optical performance of the interchangeable lens 3 may be degraded, for example, when the focusing lens 361a is not within the designed moving range (for example, the focusing lens 361a is in a region below L0 in the graph of FIG. 8). Therefore, during zoom tracking, an identifier indicating that the focusing lens 361a is not located at a designed position is always selected. Thus, selection of the identifier may be easily performed.

The interchangeable lens 3 can transmit whether or not the focusing lens 361a is located at a designed position, via the data 91d in the hotline communication. The camera body 2 can then perform processing in consideration of the fact that the focusing lens 361a is not located at a designed position, that is, in consideration of the possibility of deterioration in the optical performance.

The data 91b relates to the reliability of the data 91a, which is positional information, and includes an identifier indicating whether or not the data 91a is valid. The body-side control unit 230 can know the reliability of the data 91a (positional information) from the data 91b.

Further, in the case where the focus position is adjusted by the plurality of focusing lenses 363, 364, the lens-side control unit 330 cannot define a photographing distance if the relative positions of the focusing lenses 363, 364 in the optical axis O direction are different from designed positions. This reduces the reliability of the data 91a. Specifically, in FIG. 12A, when a zoom operation is performed from a focal length W via a focal length M to a focal length T, the movement trajectory at the time of optical performance priority and the movement trajectory at the time of speed priority of the focusing lens 363 match with each other. The focusing lens 363 therefore moves from a point P(0, W) via a point P(0, M) to a point P(0, T). Thus, the numerical value indicating the position in the optical axis O direction remains to be 0. On the other hand, the movement trajectory at the time of optical performance priority and the movement trajectory at the time of speed priority of the focusing lens 364 do not match with each other. Therefore, when the focusing lens 364 moves with speed priority in zoom tracking, for example, the focusing lens 364 moves from a point P'(0, W) via a point P'(191, M) to a point P'(0, T). Thus, the numerical value indicating the position in the optical axis O direction changes from 0 to 191, for example. As a result, the numerical values indicating the positions in the optical axis O direction do not match between the focusing lens 363 and the focusing lens 364, so that the photographing distance cannot be defined. In such a case, the lens-side control unit 330 specifies the data 91a as upper or lower limit values of a limit range, the data 91d as an identifier indicating that the plurality of focusing lens 363, 364 are provided and zoom tracking in progress, and the data 91b as an identifier indicating that the positional information (data 91a) is invalid. In the present embodiment, when a plurality of focusing lenses 363, 364 are provided, an identifier indicating that the positional information is invalid is always selected in the data 91b during zoom tracking, so that selection of the identifier can be easily performed. However, this is not limiting. For example, as shown in FIG. 12B, in the case where the movement trajectory at the time of optical performance priority and the movement trajectory at the time of speed priority of the focusing lens 364 partly match with each other, the lens-side control unit 330 may select an identifier of the data 91b according to whether or not the numerical value indicating the position of the focusing lens 363 in the optical axis O direction matches the numerical value indicating the position of the focusing lens 364 in the optical axis O direction. In that case, the number of times of hotline communication in which the data 91a is determined to be invalid based on the data 91b can be reduced. Further, the data 91b may always indicate that the data 91a is valid regardless of the reliability of the data 91a, when the number of the focusing lenses 361a is one. That is, the data 91b may indicate the reliability of the positional information when the number of the focusing lenses 363, 364 are plural.

The data 91e relates to the operation states of the operation members such as the zoom operation ring 375. An operating state of an operating member is represented by an identifier indicating whether or not the operating member is in operation, an identifier indicating the operating direction of the operating member, an identifier indicating the operating speed of the operating member, and the like. When the zoom operation ring 375 is rotated so that a zoom operation is performed, the lens-side control unit 330 selects the identifier indicating that the operation member is in operation, in the data 91e, and recognizes that the zoom lens 361c has moved in the optical axis O direction so that the focal length of the image-capturing optical system 360 has changed. The focal length recognized by the lens-side control unit 330 is also transmitted in the command data communication, based on a transmission instruction from the camera body 2.

Figure 8:
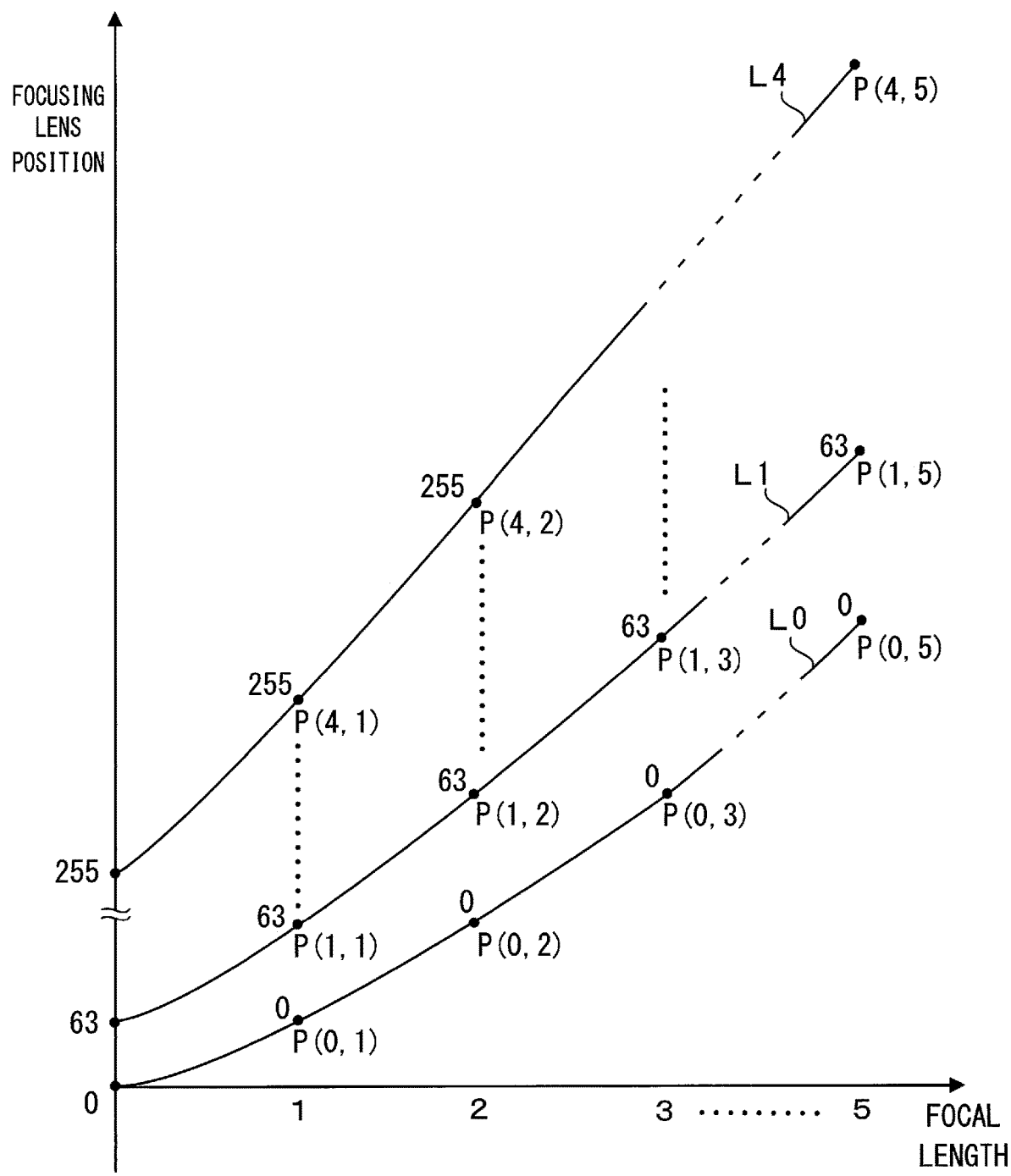
FIG. 8 is a diagram illustrating a relationship between a focusing lens position, a focal length, and a photographing distance.

Here, when a zoom operation is performed, it is necessary to perform so-called zoom tracking in order to change the focal length while the photographing distance remains unchanged. FIG. 8 shows a relationship between the focal length ("wide" corresponds to 0 and "tele" corresponds to 5), the photographing distance ("infinity" corresponds to L0 and "closest" corresponds to L4), and the position of the focusing lens 361a in the optical axis O direction (the designed value). The lens-side storage unit 350 stores a table indicating the relationship between the photographing distance and the position of the focusing lens 361a in the optical axis O direction for each of the focal lengths 0 to 5. In the present embodiment, the position of the focusing lens 361a in the optical axis O direction is represented by a numerical value corresponding to the number of pulses of the lens drive unit 370a. For example, when the focusing lens 361a is located at P(0, 1) in FIG. 8 before the zoom operation, the lens drive unit 370a moves the focusing lens 361a to positions P(0, 2), P(0, 3), . . . in FIG. 8 by zoom tracking. In this way, in the case of performing the zoom tracking accompanying the zoom operation, the focusing lens 361a may be moved with speed priority during the zoom tracking. In that case, for example, if the focusing lens 361a is moved on a straight line connecting P(0, 1) and P(0, 5) in FIG. 8, the focusing lens 361a does not pass through designed positions on a curve L0, which may degrade the optical performance of the image-capturing optical system 360. However, according to the present embodiment, the camera body 2 can recognize that the zoom operation is in progress and the focusing lens 361a may not be located at the designed position, in the hotline communication.

The data 91f relates to the operation statuses for the focusing drive instruction and is represented by an identifier indicating whether or not the interchangeable lens 3 is executing a drive instruction, an identifier indicating whether or not the interchangeable lens 3 is ready for receiving the drive instruction, an identifier indicating whether or not the interchangeable lens 3 has completed the execution of the drive instruction, and the like. In the present embodiment, an identifier indicating that the interchangeable lens 3 is not ready for receiving and executing the drive instruction is always selected during zoom tracking. However, this is not limiting. According to the present embodiment, the camera body 2 can recognize the completion of the execution of the drive instruction in the hotline communication having a short interval, and can thus immediately perform a process after the completion of the execution. In the case of a focus drive instruction, the process after the completion of the execution includes, for example, a process of informing the user that the subject is in focus after the drive instruction. Therefore, the user can recognize immediately that the subject is in focus, and thus the user does not miss a photo opportunity.

Additionally, the data 91 may include an ID number or the like for recognizing a drive instruction transmitted by the camera body 2. In the case where the interchangeable lens 3 is drive-controlled based on a drive instruction from the camera body 2, the data 91 may include an ID number or the like included in the command packet 402 of the drive instruction. Even when drive instructions of the same type are periodically transmitted from the camera body 2 such as focus drive instructions, it is possible to transmit, to the camera body 2, information that the interchangeable lens 3 operates based on which drive instruction output at which timing.

Description of Second Data 92

FIG. 9 is a view for explaining information included in the second data 92.

The second data 92 includes, for example, at least one of data 92h to 92k on a shake correction amount in the interchangeable lens 3, data 92l, 92m on a shake amount of the subject image on the image-capturing surface 260S calculated by the interchangeable lens 3, and data 92n, 92o on a residual shake amount determined from a detection signal that is detected in the shake sensor 390 and a position of the shake correction lens 361b, data 92a to 92d on a shake state detected by the shake sensor 390, data 92e, 92f on the reliability of a shake correction amount or a calculated shake amount, and data 92g on a movement state of the shake correction lens 361b.

The data 92a to 92d relate to the shake state detected by the shake sensor 390 and include an identifier selected by the lens-side control unit 330 based on a detection signal from the shake sensor 390. The lens-side control unit 330 determines the shake state from the detection signal of the shake sensor 390. In the present embodiment, the shake state is determined as a state of composition changing, a state of stable composition, a state of tripod fixation, and the like. The lens-side control unit 330 selects an identifier indicating whether or not the composition is changing, an identifier indicating whether or not the composition is stable, and an identifier indicating whether or not the camera body is fixed to the tripod, and transmits each identifier as the hotline data 90. Additionally, the lens-side control unit 330 performs a shake correction control suitable for each shake state, such as a change in a cutoff frequency of the detection signal.

The data 92a indicates a shake state for an angular shake in the X-axis direction output by the shake sensor 390. For example, based on the angular shake detection signal in the X-axis direction, the lens-side control unit 330 selects an identifier indicating whether or not the composition is changing, an identifier indicating whether or not the composition is stable, and an identifier indicating whether or not the camera body is fixed to the tripod, and transmits the identifier as the data 92a.

The data 92b is different from the data 92a in that the above-described determination is made for the Y-axis direction.

The data 92c is different from the data 92a in that the above-described determination is made for a translational shake.

The data 92d is different from the data 92a in that the above-described determination is made for a translational shake in the Y-axis direction.

The body-side control unit 230 can know the determination result of the shake state in the interchangeable lens 3 in the data 92a to 92d. Therefore, the body-side control unit 230 can perform a shake correction control according to the determination result of the shake state in the interchangeable lens 3. Note that the shake state may be determined based on the detection result of the shake sensor 290 also in the body-side control unit 230, or the shake state may not be determined based on the detection result of the shake sensor 290 in the body-side control unit 230.

The data 92g relates to the movement state of the shake correction lens 361b and includes an identifier selected by the lens-side control unit 330 based on the shake control state of the interchangeable lens 3. In the present embodiment, the shake control state may include, for example, a state during still-image stabilization, a state during moving-image stabilization, a state during non-shake correction, and the like. The state during non-shake correction is a state in which the lens drive unit 370b is not driven and shake correction is not performed. The state during still-image stabilization is a state in which a suitable shake correction is being performed during image-capturing of a still image, based on a still-image stabilization start instruction transmitted from the camera body 2 in the command data communication. The state during moving-image stabilization is a state in which a suitable shake correction is being performed during image-capturing of a moving image or image-capturing of a live view image, based on a moving-image stabilization start instruction transmitted from the camera body 2 in the command data communication. Generally, the shake correction is set to provide a stronger effect during moving-image stabilization than that during still-image stabilization.

The body-side control unit 230 can know the movement state of the shake correction lens 361b from the data 92g and can reflect it on the control of the shake correction in the body-side control unit 230.

The data 92h to 92k relate to the shake amount (shake correction amount) corrected in the interchangeable lens 3 and represent a numerical value indicating the position of the shake correction lens 361b by the lens drive unit 370b, or a numerical value indicating the movement amount of the shake correction lens 361b calculated from the position of the shake correction lens 361b by the lens-side control unit 330.

The data 92h indicates a current position of the optical axis O' of the shake correction lens 361b in the X-axis direction. In the present embodiment, the data 92h represents a coordinate value in the X-axis direction detected in the interchangeable lens 3 converted into a coordinate value (image plane conversion value) on the image-capturing surface 260S of the image sensor 260. The image plane conversion value is calculated by multiplying the coordinate value of the shake correction lens 361b detected by the interchangeable lens 3 by a stabilization factor. The stabilization factor represents a movement amount of the image plane on the image-capturing surface 260S with respect to a unit movement amount of the shake correction lens 361b. The stabilization factor is a value that varies depending on the focal length and photographing distance of the image-capturing optical system 360. The stabilization factor is stored in the lens-side storage unit 350 or the like. The lens-side control unit 330 reads a stabilization factor according to a focal length and a photographing distance at a time of detecting the coordinate value of the shake correction lens 361b, from the lens-side storage unit 350, and calculates the image plane conversion value.

The calculation of the image plane conversion value in the interchangeable lens 3 has an effect that it is not necessary to transmit the stabilization factor according to the focal length and the photographing distance, to the camera body 2. However, the value before the image plane conversion may be transmitted in the hotline communication.

The data 92i is different from the data 92h in that the above-described determination is made for the Y-axis direction.

The data 92j is different from the data 92h in that the data 92j is a shake correction amount determined by the lens-side control unit 330 from the position of the shake correction lens 361b. For example, the lens-side control unit may set a value of the data 92h as the data 92j; may set a coordinate value representing a position of the shake correction lens 361b as the data 92j without the image plane conversion; or may set a movement amount of the shake correction lens 361b calculated from the position of the shake correction lens 316b as the data 92j.

The data 92k is different from the data 92j in that the above-described determination is made for the Y-axis direction.

The body-side control unit 230 can know a shake amount (shake correction amount) corrected in the interchangeable lens 3 from the data 92h to 92k.

The data 92l, 92m relate to the shake amount (total shake amount) of the subject image on the image-capturing surface 260S calculated in the interchangeable lens 3, and is represented by a numerical value calculated by the lens-side control unit 330 from a detection signal of the shake sensor 390 and a stabilization factor at the time of outputting the detection signal.

The data 92*l* represents the total shake amount in the X-axis direction detected by the interchangeable lens 3 which is subjected to image plane conversion. The image plane conversion is as described above.

The data 92*m* is different from the data 92*l* in that the above-described determination is made for the Y-axis direction.

The body-side control unit 230 can know the total shake amount calculated by the interchangeable lens 3 from the data 92*l*, 92*m*, and can determine whether or not the total shake amount has been corrected completely.

The data 92*n*, 92*o* relates to the residual shake amount determined from the detection signal detected by the shake sensor 390 and the position of the shake correction lens 361*b*, and represent values calculated by the lens-side control unit 330. Here, the residual shake amount may be a value obtained by subtracting the shake correction amount represented by the data 92*j*, 92*k* from the total shake amount represented by the data 92*l*, 92*m*. Since the residual shake amount can also be calculated in the camera body 2, the residual shake amount may be omitted from the hotline data 90 when at least one of the shake correction amount and the current position of the shake correction lens 361*b*, as well as the total shake amount, may be sent.

The data 92*n* represents a residual shake amount in the X-axis direction, which could not corrected in the interchangeable lens 3, converted into an amount on the image-capturing surface 260S of the image sensor 260. The image plane conversion is as described above.

The data 92*o* is different from the data 92*n* in that the above-described determination is made for the Y-axis direction.

From the data 92*n*, 92*o*, the body-side control unit 230 can know a shake amount remaining even after the shake correction control with the interchangeable lens 3 is performed. The body-side control unit 230 can thus correct a shake that cannot be corrected by the interchangeable lens 3, without calculation of the shake amount from the detection signal of the shake sensor 290 in the body-side control unit 230.

The data 92*e*, 92*f* relate to the reliability of the positional information on the shake correction lens 361*b* and the reliability of the calculated shake amount and shake correction amount, and include an identifier selected based on the reliability of the data 92*h* to 92*o* by the lens-side control unit 330. In the present embodiment, the data 92*e*, 92*f* indicate whether or not the data 92*h* to 92*o* are individually valid. However, this is not limiting.

The body-side control unit 230 can know the reliability of the data 92*h* to 92*o* from the data 92*e*, 92*f*

Description of Auto Focus Adjustment

Figure 10:
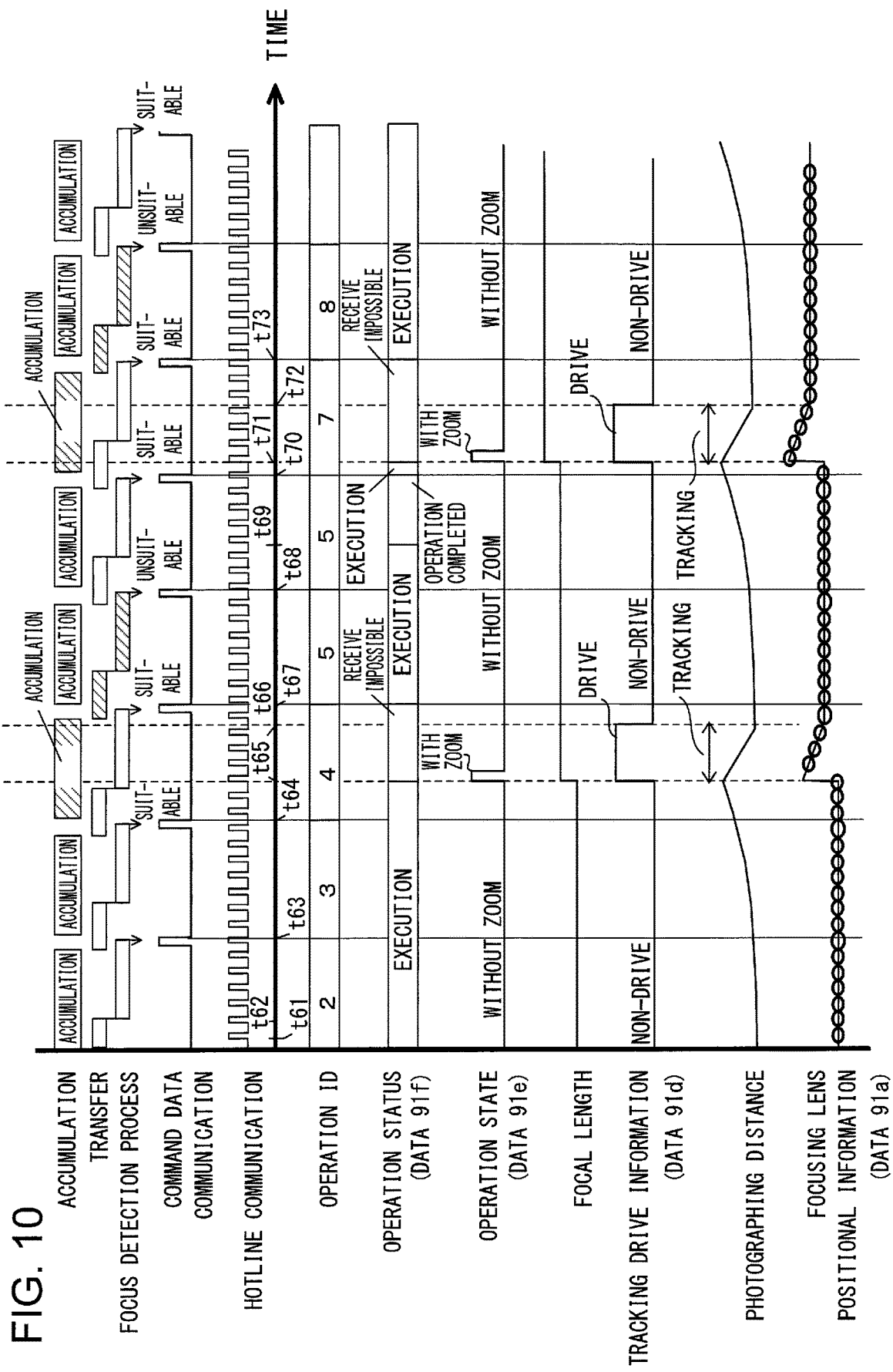
FIG. 10 is a diagram illustrating a timing of an automatic focus adjustment.

Hereinafter, an example of automatic focus adjustment accompanied by zoom tracking will be described with reference to FIG. 10. FIG. 10 is a timing chart illustrating a timing of automatic focus adjustment. FIG. 10 shows an example in which an operation of capturing a monitor image referred to as a live view image is repeated at every frame rate of 1/60 second, for example.

It is assumed that hotline communication has been started before the timing chart of FIG. 10 and the hotline data 90 is periodically transmitted from the interchangeable lens 3 to the camera body 2 at time points t61, t62, . . . . Further, it is assumed that, at time point t61 in FIG. 10, the interchangeable lens 3 is executing a focus drive instruction having the operation ID 2 and the user is operating the zoom operation ring 375. From time point t61, the zoom operation ring 375 continues to be rotationally operated so that the photographing distance continues to change. At time points t65, t71, an operation signal of the zoom operation ring 375 is output and the focal length recognized by the lens-side control unit 330 is changed stepwise. Further, in FIG. 10, the distance between the subject and the camera body 2 does not change, and the position of the focusing lens 361*a* in the optical axis O direction is adjusted by zoom tracking accompanying the operation of the zoom operation ring 375. Furthermore, in FIG. 10, the positional information on the data 91*a* is represented by a numerical range from the near end 0 to the infinite end 255 at each focal length. Thus, at time point t65 when the focal length recognized by the lens-side control unit 330 changes stepwise, the numerical value of the data 91*a* changes significantly even if the position of the focusing lens 361*a* in the optical axis O direction remains unchanged.

A reason why the data 91*a* changes at time point t65 in FIG. 10 will be described below with respect to FIG. 8. FIG. 8 shows positions in the optical axis O direction of the focusing lens 361*a*, with values from 0 to 255 corresponding to the positions from infinity to a near end of the focusing lens 361*a* at each focal length. Therefore, in P(0, 0), P(0, 1), . . . , P(0, 5) of FIG. 8, the numerical value included in the data 91*a* is 0. Similarly, in P(4, 0), P(4, 1), . . . , P(4, 5) of FIG. 8, the numerical value included in the data 91*a* is 255.

Assuming that the focusing lens 361*a* is located at a position shown by P (0, 2) in FIG. 8 with a focal length 2 and a photographing distance L0 until time point t64, the value of the data 91*a* as the positional information on the focusing lens 361*a* is 0. Therefore, the value of the data 91*a* is 0 until time point t64.

Next, when the focal length changes to 1 at time point t65 while the position of the focusing lens 361*a* remains unchanged, the value of the data 91*a* changes from 0, which corresponds to P(0, 2) in FIG. 8, to 63, which corresponds to P(1, 1), due to a change in a table to be referenced. That is, the lens-side control unit 330 refers to a table for the focal length 1 and recognizes that the photographing distance has changed to L1. Then, the lens-side control unit 330 moves the focusing lens 361*a* to P(0, 1), at which the value of the data 91*a* corresponds to 0, in order to return to the photographing distance L0 before the zoom operation by zoom tracking. The zoom tracking is performed between time point t65 and t66, so that the value of the data 91*a* changes from 63 to 0.

The signal processing unit 270 performs predetermined image processing on an image-capturing pixel signal output from the image sensor 260 every time one accumulation is completed, to generate a live view image. Further, the signal processing unit 270 calculates a defocus amount based on the focus detection pixel signal output from the image sensor 260 each time one accumulation is completed. The body-side first control unit 230*a* also calculates the drive amount of the focusing lens 361*a* based on the calculated defocus amount and the positional information (current position) of the focusing lens 361*a* transmitted in the hotline communication.

Here, in the present embodiment, when the drive amount is calculated based on the focus detection pixel signal output in accordance with an accumulation until the time point t63, at least one positional information on the focusing lens 361*a* to be transmitted in the hotline communication shown at time points t61, t62, . . . included in the accumulation time is used (preferably, the average of a plurality of positional information is calculated). In this way, since the drive amount of the focusing lens 361*a* can be calculated using the positional information on the focusing lens 361*a* at time points included in the accumulation time, the accuracy of the focus adjustment is improved. The body-side first control unit 230a transmits the focus detection pixel signal output in accordance with the accumulation until the time point t63 and the drive amount based on the hotline data 90 between time point t61 and t63 as a focus drive instruction having the operation ID 4 in the command data communication at time point t64. According to the present embodiment, the body-side first control unit 230a transmits a focus drive instruction with an operation ID for each accumulation, for example, at time points t63, t64, t67, t68, t70, t73. The interchangeable lens 3 starts drive of the focusing lens 361a based on the focus drive instruction of a new operation ID, and transmits the currently executed operation ID in the hotline communication. Here, although not shown in FIG. 10, the camera body 2 may perform command data communication for each accumulation so that information such as a focal length required for a focus detection process is acquired from the interchangeable lens 3. Further, the operation ID and the operation status may be transmitted to the camera body 2 both in the command data communication and in the hotline communication.

When the operation signal of the zoom operation ring 375 is output at time point t65, the lens-side control unit 330 changes the identifier of the data 91e and transmits the fact that the zoom operation has been performed, to the camera body 2 in the hotline communication. Additionally, the lens-side control unit 330 changes identifiers of the data 91d and the data 91f between time points t65 and t66 during zoom tracking, and transmits the fact that zoom tracking is in progress and the focus drive instruction cannot be executed, to the camera body 2 in the hotline communication.

When calculating the drive amount of the focusing lens 361a based on the focus detection pixel signals accumulated between time points t64 and t67, the body-side first control unit 230a may calculate the drive amount without positional information (data 91a) on the hotline data 90 including data 91d, 91f indicating that the zoom tracking is in progress. That is, the body-side first control unit 230a may calculate the drive amount using highly reliable positional information transmitted between the times t64 and t65 and between t66 and t67. Alternatively, the body-side first control unit 230a may output, to the interchangeable lens 3, a focus drive instruction based on the focus detection pixel signal accumulated between time points t64 and t67, along with information ("unsuitable" in FIG. 10) indicating that positional information having a less reliability is also used to create the focus drive instruction. In that case, the interchangeable lens 3 may discard the received focus drive instruction and still use the immediately preceding operation ID 5 to indicate that the operation is completed at time point t69.

Generally, in the automatic focus adjustment process, the position of the focusing lens 361a changes when zoom tracking is performed during accumulation, which may lower the accuracy of the calculation result of the drive amount (in particular, the defocus amount). However, according to the present embodiment, the information on the reliability of the positional information is included in the hotline data 90. Thus, the camera body 2 can take appropriate actions. For example, positional information having a low reliability is not used in calculating the drive amount; a focus detection instruction is not output based on a focus detection pixel signal accumulated in receiving the hotline data 90 indicating a reduction in the reliability; and a focus drive instruction is output with information indicating that the instruction is created based on a focus detection pixel signal accumulated in receiving the hotline data 90 indicating a reduction in the reliability; and so on.

Description of Shake Correction

The camera system 1 according to the present embodiment can perform a lens-side shake correction performed by the lens drive unit 370b driving the shake correction lens 361b and a body-side shake correction performed by the sensor drive unit 265 driving the image sensor 260. Therefore, for example, a lens-side shake correction for driving the shake correction lens 361b is performed, and a body-side shake correction is performed on a shake amount remaining even after the lens-side shake correction, so that the shake correction effect can be improved. Further, the lens-side shake correction and the body-side shake correction can cooperate with each other to improve a shake correction effect. When lens-side shake correction and body-side shake correction are cooperated with each other, a shake state determined by the interchangeable lens 3 is transmitted to the camera body 2 in the hotline communication, so that the camera body 2 can perform a control that matches the shake state of the interchangeable lens 3.

As described above, the lens-side control unit 330 determines the tripod fixation state, the composition changing state, and the composition stable state as the shake state based on the detection signal of the shake sensor 390. Further, the lens-side control unit 330 and the second body-side control unit 230b can adjust the effect of shake correction by appropriately changing a threshold and a factor depending on the shake state.

For example, a movable range of the shake correction lens 361b or the image sensor 260 (hereinafter, referred to as a movable unit) or a frequency band of the shake to be corrected can be changed depending on the shake state. In the tripod fixation state, a shake detection signal in a frequency band of approximately 10 Hz or more which is likely to be generated during the tripod fixation may be extracted and corrected. In the composition changing state, the frequency band may be limited to a specific range or the movable range may be reduced so as not to correct the shake of the interchangeable lens 3 intended by the user due to a change in the composition. In the composition stable state, a frequency band range may be made wider than that in the composition changing state and the movable range may be made larger; for example, the movable range may be matched with a mechanical movable range.

The lens-side control unit 330 calculates a total shake amount detected on the interchangeable lens 3 side, based on the detection signal of the shake sensor 390. The lens-side control unit 330 calculates an angular shake amount based on the detection signal of the angular speed sensor 390a, calculates a translational shake amount based on the detection signal of the acceleration sensor 390b, and uses the angular shake amount and the translational shake amount to calculate the total shake amount.

The lens-side control unit 330 further reads out a stabilization factor at a time when the detection signal is output, and calculates an image plane conversion value based on the total shake amount and the stabilization factor. Here, the lens-side control unit 330 calculates the image plane conversion value without taking the drive range (a mechanical movable range and a controlled movable range) of the shake correction lens 361b into consideration. Here, the mechanical movable range refers to a movable range based on a holding mechanism of the shake correction lens 361b, and the controlled movable range refers to a movable range limited by user settings and photographing conditions.

The lens-side control unit 330 also calculates the movement amount of the shake correction lens 361b in the X-axis direction and the Y-axis direction in consideration of the mechanical movable range and the controlled movable range. The movement amount may be calculated as target coordinate values (target positions) in the X-axis direction and the Y-axis direction.

The lens-side control unit 330, which has calculated the movement amount or target positions of the shake correction lens 361b, outputs a drive signal to the lens drive unit 370b to drive the shake correction lens 361b. The lens drive unit 370b having received the drive signal moves the shake correction lens 361b in the X-axis and Y-axis directions that intersect the optical axis O. Further, the lens drive unit 370b periodically detects positions of the shake correction lens 361b in the X-axis direction and the Y-axis direction to output the positions as current positions to the lens-side control unit 330. The lens-side control unit 330 may use values output from the lens drive unit 370b as the data 92h, 92i as they are, or may set values subjected to calculation such as image plane conversion as the data 92h, 92i.

Further, the lens-side control unit 330 calculates residual shake amounts in the X-axis direction and the Y-axis direction based on a difference between the detected current position of the shake correction lens 361b and the target position. Note that the residual shake amount may be calculated based on a difference between a movement amount to the target position calculated by the lens-side control unit 330 and a movement amount calculated from the current position of the shake correction lens 361b. The lens-side control unit 330 uses the stabilization factor at a time when the current position of the shake correction lens 361b is detected, to calculate the image plane conversion value of the residual shake amount.

The body-side second control unit 230b creates a drive signal based on at least one of: positional information on the shake correction lens 361b received in the hotline communication; a total shake amount received in the hotline communication; a residual shake amount received in the hotline communication; and a detection signal output from the shake sensor 290. The body-side second control unit 230b then outputs the drive signal to the sensor drive unit 265. The sensor drive unit 265 having received the drive signal moves the image sensor 260 in the X-axis and Y-axis directions that intersect the optical axis O. The drive amount of the image sensor 260 may be the residual shake amount received in the hotline communication, or may be a drive amount required for shake correction calculated by the body-side second control unit 230b. The calculation of the drive amount in the body-side second control unit 230b may be based on a difference between the total shake amount received in the hotline communication and the shake correction amount, may be based on an output result of the shake sensor 290, or may be based on the output result of the sensor 290 and the information received in the hotline communication. In calculating the drive amount in the body-side second control unit 230b, it is preferable that the shake state determined by the interchangeable lens 3 received in the hotline communication may be taken in consideration.

Figure 11:
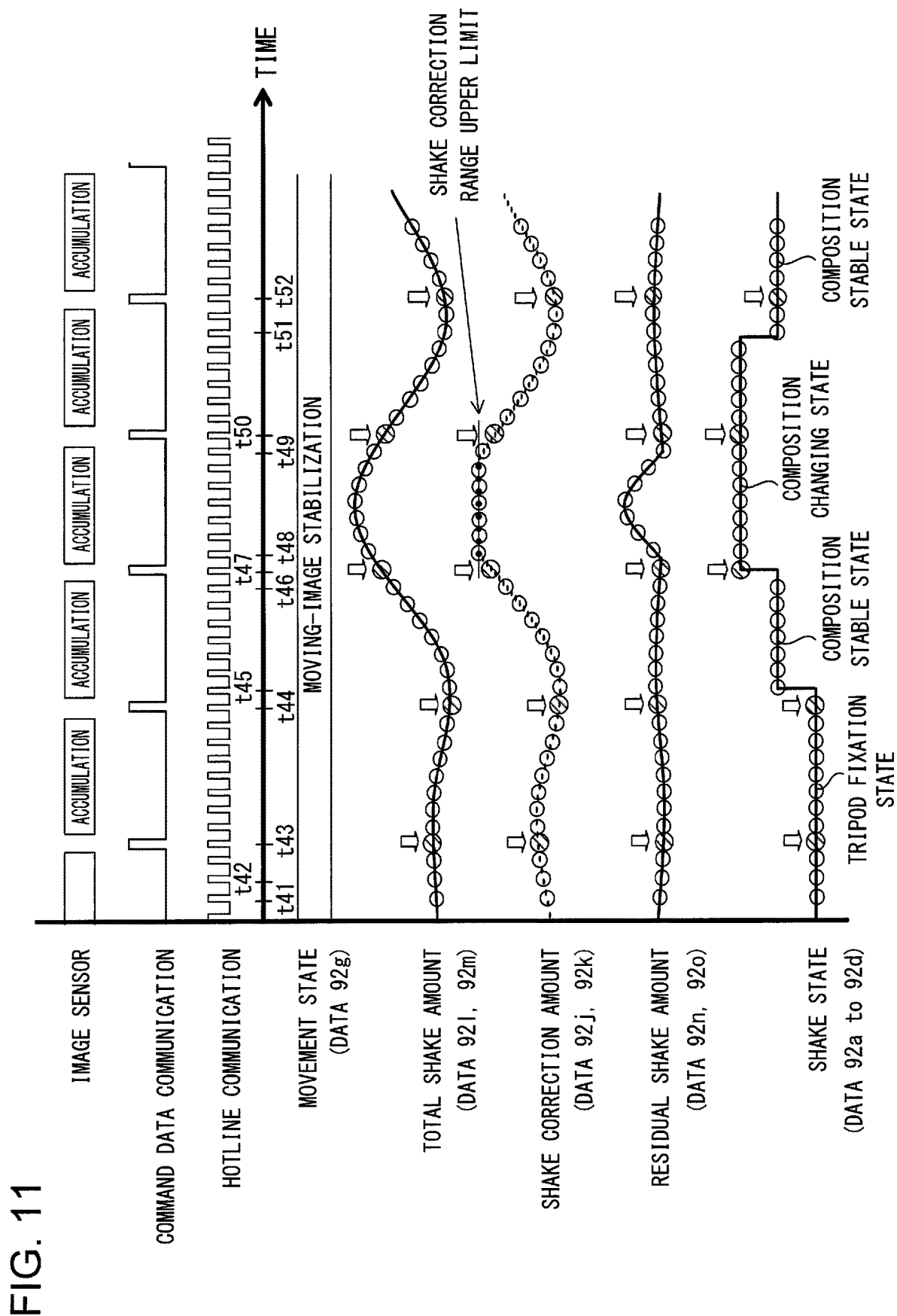
FIG. 11 is a diagram illustrating a timing of a stabilization operation.

Next, an example of the stabilization operation will be described with reference to FIG. 11. FIG. 11 is a timing chart illustrating a timing during moving-image stabilization. FIG. 11 shows an example in which a shake correction is performed while repeatedly performing an operation of capturing a monitor image called a live view image, for example, every 1/60 seconds.

It is assumed that hotline communication has been started before the timing chart of FIG. 11 and an instruction of starting moving-image stabilization has been transmitted from the camera body 2 to the interchangeable lens 3 in the command data communication, so that a drive by the lens drive unit 370b has been started.

The camera body 2 performs command data communication with the interchangeable lens 3 each time one accumulation by the image sensor 260 is completed, for example. The body-side first control unit 230a periodically performs command data communication based on a frame rate, for example, at time points t43, t44, t47, . . . . Here, the command data communication performed at time points t43, t44, t47, . . . is intended to transmit and receive information on each accumulation. For example, a photographing condition and the like are transmitted from the camera body 2 to the interchangeable lens 3, and a focal length and the like are transmitted from the interchangeable lens 3 to the camera body 2. Note that information transmitted and received in the command data communication and information transmitted and received in the hotline data communication may partially overlap each other. Therefore, information (for example, positional information on the shake correction lens 361b) used both in the body-side first control unit 230a and in the body-side second control unit 230b may be transmitted both in the hotline communication and in the command data communication. In that case, from the viewpoint of data amount, it is preferable to send coordinate values as positional information on the shake correction lens 361b in the hotline communication and send a numerical value (a difference between coordinate values) representing a movement amount of the shake correction lens 361b in the command data communication.

Furthermore, command data communication that is not based on the frame rate (for example, a focus drive instruction) may be performed between the command data communications at time points t43, t44, t47, . . . .

The lens-side control unit 330 creates hotline data 90 based on the interval of the hotline communication, for example, at each time point t41, t42, . . . . The lens-side control unit 330 then transmits the hotline data 90 from the lens-side second communication unit 340b to the camera body 2. The body-side second communication unit 240b outputs the hotline data 90 received at time points t41, t42, . . . , to the body-side first control unit 230a and the body-side second control unit 230b.

FIG. 11 shows data 92a to 92d, 92g, and 92l to 92o as examples of the second data 92. In curves representing the data 92a to 92d, 92l to 92o, timings of command data notification are indicated by arrows and timings of hotline communication are indicated by circles.

Although not shown in FIG. 11, the lens-side control unit 330 sets an identifier indicating that each of the data 92h to 92o is valid, in the data 92e and 92f. Further, in FIG. 11, the lens-side control unit 330 sets an identifier indicating "during moving-image stabilization", in the data 92g.

In FIG. 11, curves representing the data 92l to 92o are illustrated for either one of X axis or Y axis, for example. Further, the residual shake amount is shown with an exaggerated difference between the total shake amount and the shake correction amount (i.e., with a changed scale).

If information on the interchangeable lens 3 is to be transmitted to the camera body 2 only in the command data communication without using the hotline communication, only information at time points indicated by the arrows can be transmitted. Therefore, even if the total shake amount exceeds the upper limit of the shake correction range in a time period between t48 and t49, for example, the residual shake amount cannot be transmitted to the camera body 2 until time point t50 of the next command data communication.

However, in the present embodiment, the information on the interchangeable lens 3 is sent to the camera body 2 in the hotline communication. Thus, the information at time points indicated by circles can also be transmitted to the camera body 2, in addition to the information at time points indicated by arrows. Therefore, the residual shake amount can be transmitted to the camera body 2 in a time period (between time points t48 and t49) in which the total shake amount exceeds the upper limit of the shake correction range.

With this configuration, the camera body 2 can further enhance the shake correction effect, for example, by the body-side second control unit 230b performing shake correction on a residual shake amount, which could not be corrected by the interchangeable lens 3.

Further, the body-side second control unit 230b can continuously recognize the shake correction amount or the total shake amount in the interchangeable lens 3 at a short interval of the hotline communication, a shake correction control can be performed in accordance with the shake correction amount or the total shake amount of the interchangeable lens 3. For example, the body-side second control unit 230b may perform a control to correct a difference obtained by subtracting the shake correction amount of the interchangeable lens 3 from the body-side total shake amount calculated from the detection signal of the shake sensor 290, or a control to correct a difference obtained by subtracting the shake correction amount from the total shake amount in the interchangeable lens 3. Further, the body-side second control unit 230b may determine whether or not the total shake amount in the interchangeable lens 3 matches the body-side total shake amount calculated from the detection signal of the shake sensor 290. Here, if the camera body 2 does not recognize the shake correction amount in the interchangeable lens 3, the shake correction effect of the interchangeable lens 3 and the shake correction effect of the camera body 2 may cancel each other or may yield an excessive correction. However, according to the present embodiment, the shake correction amount and the total shake amount are transmitted in the hotline communication. The shake correction effect can thus be enhanced by cooperation of the camera body 2 and the interchangeable lens 3.

Based on the detection signal of the shake sensor 390, the lens-side control unit 330 sets an identifier indicating "tripod fixation state" between time points t41 and t44, an identifier indicating "composition stable state" between time points t45 and t46 and after time point t51, and an identifier indicating "composition changing state" between time points t47 and t51, in the data 92a to 92d.

Here, in the case where the shake state is transmitted in the command data communication without being transmitted in the hotline communication, the shake state cannot be transmitted until time point t52 of the next command data communication, even when the lens-side control unit 30 recognizes the composition stable state between time points t51 and t52, for example. Additionally, even when the lens-side control unit 30 recognizes the composition stable state between time points t45 and t46, for example, the shake state may have changed at time point t47 of the next command data communication. However, in the present embodiment, the shake state is sent in the hotline communication. The shake state can thus be periodically sent to the camera body 2 at each time point indicated by a circle. Therefore, a change in the shake state detected by the interchangeable lens 3 can be immediately transmitted to the camera body 2.

With this configuration, the camera body 2 can immediately recognize the shake state detected by the interchangeable lens 3, so that a time during which the shake correction control in the camera body 2 does not match the shake correction control in the interchangeable lens 3 can be reduced. When the shake correction controls of the interchangeable lens 3 and the camera body 2 do not match each other, the shake correction effect of the interchangeable lens 3 and the shake correction effect of the camera body 2 do not match each other, so that a live view image and the like may appear unnatural. However, according to the present embodiment, by matching the shake correction controls of the camera body 2 and the interchangeable lens 3, the effect of the shake correction can be enhanced as follows.

For example, the shake correction effect can be enhanced by changing a frequency band to be subjected to shake correction and a movable range of the shake correction movable unit, depending on the shake state. Further, by matching the shake states of the interchangeable lens 3 and the camera body 2, the shake correction effect can be further enhanced. Furthermore, since the shake state is transmitted from the interchangeable lens 3 to the camera body 2 in the hotline communication, a time during which the shake states of the interchangeable lens 3 and the camera body 2 deviate from each other can be reduced. If the shake state is transmitted from the interchangeable lens 3 to the camera body 2 only in the command data communication without being transmitted in the hotline communication, recognition of the detection result of the lens-side shake state by the camera body 2 would be delayed in time. As a result, a time during which the detection results of the interchangeable lens 3 and the camera body 2 deviate from each other would be large. This causes the user to feel a reduction in comfort of use (discomfort) of a finder image and a through image at the time of shake correction. However, the present embodiment is able to reduce a time during which the shake states of the interchangeable lens 3 and the camera body 2 deviate from each other.

According to the embodiment described above, the following operational advantages can be achieved.

The interchangeable lens 3 periodically transmits the first information on the position of the moving member and the second information that can be used to calculate the movement amount of the moving member, to the camera body 2 in the hotline communication. It is thus possible to improve the accuracy of the movement amount calculation performed in the camera body 2.

The interchangeable lens 3 transmits the first information and the second information to the camera body 2 in one hotline communication. The camera body 2 can thus easily take the reliability of the first information included in the second information into consideration. Additionally, in the interchangeable lens 3, the reliability of the first information is represented by an identifier indicating whether the positional information is valid or invalid. Therefore, selection of the identifier may be easily performed. Additionally, the interchangeable lens 3 uses an identifier to represent a possibility of reducing the optical performance of the image-capturing optical system 360 and can easily transmit the identifier to the camera body 2 in the hotline communication. In consideration of the second information together with the first information, the camera body 2 can take actions. For example, the camera body 2 does not use the first information having a low reliability, or the camera body 2 indicates that the drive instruction signal is created from the first information having a low reliability.

The interchangeable lens 3 can include a plurality of types of information as the second information in the hotline data 90, and can appropriately select the number and types of information that can be notified to the camera body 2 in the hotline communication. Since the camera body 2 can receive a plurality of types of information in one hotline communication, it is not necessary to take the timing of acquiring each type of information into consideration, compared with a case of receiving a plurality of types of information in a plurality of communications. Therefore, a movement control can be easily performed.

The interchangeable lens 3 can include information on a plurality of moving members in one hotline data 90. For example, positional information on the focusing lens 361a and positional information on the shake correction lens 361b can be transmitted to the camera body 2 in one hotline communication.

The interchangeable lens 3 outputs the HCLK signal of the hotline communication together with the HDATA signal, so that the hotline communication can be performed on the initiative of the interchangeable lens 3. Further, the camera body 2 outputs the CLK signal of the command data communication together with the DATAB signal, so that the command data communication can be performed on the initiative of the camera body 2. Therefore, the camera body 2 and the interchangeable lens 3 can respectively take the initiative of the two independent communication systems.

The interchangeable lens 3 periodically transmits information on the position of the shake correction lens 361b and information on the total shake amount calculated in the interchangeable lens 3, to the camera body 2. In this way, cancellation of the shake correction effects of interchangeable lens 3 and the camera body 2 can be reduced.

The interchangeable lens 3 can also transmit the coordinates in the X-axis direction and the Y-axis direction intersecting the optical axis O output from the lens drive unit 370b as information on the position of the shake correction lens 361b as they are. This can reduce a load for creating the hotline data 90.

The interchangeable lens 3 can also transmit at least one of information, as an image plane conversion value, on the position of the shake correction lens 361a, a shake correction amount, a total shake amount, and a residual shake amount. This can also reduce a load of calculation in the camera body 2.

Further, all information included in one hotline data 90 can be subjected to image plane conversion in the interchangeable lens 3 to prevent that different stabilization factors are used in the interchangeable lens 3 and the camera body 2 for image plane conversion on information included in one hotline data 89.

The lens-side second communication unit 340b can also periodically transmit the hotline data 90 at an interval shorter than that of receiving an instruction from the camera body 2 in the command data communication. This allows information used for movement amount calculation of the moving member to be immediately transmitted, regardless of timing and time period of the command data communication.

The shake sensor 390 can also periodically output the detection signal at an interval shorter than that in the hotline communication. This can enhance the immediacy of the hotline data 90 because it is not necessary to consider a deviation between the timing of outputting the hotline data 90 and the timing of outputting the detection signal of the shake sensor 390.

The interchangeable lens 3 can also transmit the reliability of numerical values (positional information, shake correction amount, total shake amount, residual shake amount) included in the hotline data 90. Thus, the interchangeable lens 3 can transmit the numerical values and their corresponding reliability to the camera body 2 in one hotline communication so that the camera body 2 can take actions depending on the reliability.

The interchangeable lens 3 can also transmit the movement state of the moving member. It is thus possible to improve the coordinate between an accumulation timing of the image sensor 260 of the camera body 2 and a moving timing of the moving member of the interchangeable lens 3.

The interchangeable lens 3 periodically transmits the hotline data 90 having a fixed length to the camera body 2. The interchangeable lens 3 can therefore repeat transmission at a constant interval, unlike a case of transmitting data having a variable length.

The present invention is not limited to the contents described above. Other embodiments contemplated within the scope of the technical idea of the present invention are also included within the scope of the present invention.

First Modification

In the above description, an example of using the DMA function in the hotline communication has been described. Instead of using the DMA function, the CPU may be interposed to generate the hotline data 90. In a first modification, transmission of the HDATA signal is performed by the lens-side second communication unit 340b, and generation of the hotline data 90 is performed by the lens-side control unit 330. With this configuration, the hotline communication and the generation of the hotline data 90 can be performed in parallel without using the DMA function. However, the generation of the hotline data 90 is performed within a time period that does not exceed one interval of the hotline communication.

Second Modification

In the above description, an example in which the body-side control unit 230 is divided into the body-side first control unit 230a and the body-side second control unit 230b has been described. However, the body-side control unit 230 may be configured as one functional unit, without dividing the body-side first control unit 230a and the body-side second control unit 230b. In this case, the body-side control unit 230 may directly control the sensor drive unit 265, and a communication line by the body-side second communication unit 240b may be connected to only the one single body-side control unit 230.

Further, in the example of the hotline communication of FIG. 6, a data transfer direction of a clock synchronous communication using only two signal lines, i.e., the HCLK signal line and the HDATA signal line, is one direction from the interchangeable lens 3 to the camera body 2. However, one more signal line may be added to enable bidirectional data transfer. Alternatively, data communication may be performed bidirectionally by configuring input and output of the HDATA signal line to be switchable.

The hotline communication is not limited to clock synchronous communication. UART (Universal Asynchronous Receiver/Transmitter communication) may be used. Further, in addition to the clock signal line and the data signal line, a handshake signal line or a CS (chip select) signal line is added to synchronize the communication start timings between the lens-side control unit 330 and the body-side first and second control units 230*a*, 230*b*.

Third Modification

In the camera body 2, the sensor drive unit 265 that drives the image sensor 260 in a direction intersecting the optical axis O may be omitted, and a shake correction for moving the position of the image may be performed by image processing performed by the signal processing unit 270. Alternatively, in the camera body 2, a shake correction by the sensor drive unit 265 and a shake correction by the signal processing unit 270 may be performed together.

Fourth Modification

The shake correction may be shared between the interchangeable lens 3 and the camera body 2 with a determined share ratio. For example, a share ratio in a shake correction on the total shake amount, which is calculated in the interchangeable lens 3, performed by the interchangeable lens 3 and the camera body 2 is determined in advance. The lens-side control unit 330 moves the shake correction lens 361*b* so as to cancel a shake amount obtained by multiplying the calculated total shake amount by the share ratio of the interchangeable lens 3.

On the other hand, the body-side second control unit 230*b* performs a shake correction control so as to cancel a shake amount obtained by multiplying the total shake amount by the share ratio of the camera body 2.

According to a fourth modification, by determining the share ratio in a shake correction performed by the interchangeable lens 3 and the camera body 2, the shake correction can be properly shared between the interchangeable lens 3 and the camera body 2.

The share of correction between the interchangeable lens 3 and the camera body 2 may be set as the share ratio, or may be set as a predetermined correction amount. Further, a shake amount beyond a drive range of the shake correction lens 361*b* may be corrected in the camera body 2. Furthermore, a controlled drive range of the shake correction lens 361*b* may be transmitted to the camera body 2 in the hotline communication.

Fifth Modification

The interchangeable lens 3 and the camera body 2 may share a shake correction depending on shake components. For example, the interchangeable lens 3 undertakes angular shake correction and a predetermined amount of translational shake, and the camera body 2 undertakes shake (roll component) about the optical axis O and the remaining translational shake. The predetermined amount of the translational shake means that the correction amount is limited to an extent that the optical performance of the image-capturing optical system 360 is not adversely affected. In a fifth modification, the lens-side control unit 330 may add data on shake components that the unit 330 does not undertake, in the hotline data 90.

The lens-side control unit 330 and the body-side second control unit 230*b* control a shake correction depending on shake components, so that the shake correction can be appropriately shared between the interchangeable lens 3 and the camera body 2.

Sixth Modification

Based on a shake state transmitted in the hotline data 90, the body-side second control unit 230*b* performs a shake correction control so as to be suitable for the shake state. However, this is not limiting. In the present embodiment, the camera body 2 is also provided with the shake sensor 290, so that the body-side second control unit 230*b* may perform a shake correction control in consideration of both the hotline data 90 and the detection signal of the shake sensor 290.

Seventh Modification

The data 91*d* has been described as including an identifier indicating whether or not zoom tracking is in progress and an identifier indicating that movement is performed with speed priority in the above embodiment. However, this is not limiting. Other examples of states where the focusing lens 361*a* is not located at a designed position include a state during an initialization process of the lens drive unit 370*a*, a state during an error occurring in the interchangeable lens 3, and a state during drive of the focusing lens 361*a* for certain reasons other than focus adjustment.

Eighth Modification

In the above embodiment, the data 91*b* has been described as including an identifier indicating unreliability during zoom tracking, with the plurality of focusing lenses provided. However, this is not limiting. The data 91*b* may include a numerical value corresponding to the reliability of the data 91*a*, or may include an identifier indicating whether the positional information on one focusing lens is valid or invalid. Further, the number of the lens-side control unit 330 is not limited to the number of focusing lenses, but may include an identifier indicating "invalid" in the data 91*d* when information (indicated by numerical values of 0 to 255, in the present embodiment) corresponding to a photographing distance cannot be determined.

REFERENCE SIGNS LIST

1 . . . camera system, 2 . . . camera body, 3 . . . interchangeable lens, 90 . . . hotline data, 91, 92 . . . data, 210 . . . body-side mount, 230 . . . body-side control unit, 235 . . . storage unit, 240 . . . body-side communication unit, 265 . . . sensor drive unit, 270 . . . signal processing unit, 310 . . . lens-side mount, 330 . . . lens-side control unit, 340 . . . lens-side communication unit, 350 . . . lens-side storage unit, 360 . . . image-capturing optical system, 370 . . . lens drive unit, 375 . . . zoom operation ring

The invention claimed is:

1. An interchangeable lens that is removably attachable to a camera body, the lens comprising:
   a clock receiving unit that receives a first clock signal from the camera body;
   a clock transmitting unit that outputs a second clock signal to the camera body;
   a moving member that is movable within the interchangeable lens;
   a first communication unit that performs first communication in which (i) an instruction is received from the camera body in synchronization with the first clock signal and (ii) information of the interchangeable lens is transmitted to the camera body in synchronization with the first clock signal; and
   a second communication unit that performs second communication in which (i) first information indicating a position of the moving member and (ii) second information that can be used for calculation of a movement amount of the moving member are repeatedly transmitted to the camera body in synchronization with the second clock signal.

2. The interchangeable lens according to claim 1, wherein:
the second information includes information indicating a reliability of the first information.

3. The interchangeable lens according to claim 1, wherein:
the second information includes information indicating a state in the interchangeable lens.

4. The interchangeable lens according to claim 1, comprising:
an operation ring that is operable by a user to change a focal length of an optical system, wherein:
the second information includes information indicating an operation state of the operation ring.

5. The interchangeable lens according to claim 1, wherein:
the second information includes information indicating that the moving member is moving.

6. The interchangeable lens according to claim 1, wherein:
a designed position of the moving member on an optical axis is set according to at least one of a focal length of the optical system or a photographing distance; and
the second information includes information indicating that the moving member is at the designed position.

7. The interchangeable lens according to claim 1, comprising:
a relative member, a relative position of the relative member to the moving member being set according to at least one of a focal length of the optical system or a photographing distance, wherein:
the second information includes information indicating that the relative position of the relative member to the moving member is the set relative position.

8. The interchangeable lens according to claim 1, wherein:
the moving member is movable in an optical axis direction of an optical system.

9. The interchangeable lens according to claim 1, wherein:
the moving member is movable in a direction intersecting an optical axis of an optical system.

10. The interchangeable lens according to claim 1, wherein:
the first communication unit receives an instruction for movement of the moving member in synchronization with the first clock signal.

11. The interchangeable lens according to claim 1, wherein:
the first communication unit is configured to receive an instruction for movement of the moving member; and
the second communication unit is configured to transmit an operation status according to the instruction.

12. The interchangeable lens according to claim 1, wherein:
the moving member includes a first moving member that moves in an optical axis direction of an optical system, and the moving member includes a second moving member that moves in a direction intersecting the optical axis of the optical system; and
the first information includes first position information indicating a position of the first moving member and second position information indicating a position of the second moving member.

13. The interchangeable lens according to claim 12, wherein:
the second information includes information on the first moving member and information on the second moving member.

14. A method of transmitting data in an interchangeable lens that is removably attachable to a camera body, the interchangeable lens comprising therein a moving member that is movable, the method comprising:
receiving a first clock signal from the camera body;
performing first communication in which (i) an instruction is received from the camera body in synchronization with the first clock signal and (ii) information of the interchangeable lens is transmitted to the camera body in synchronization with the first clock signal;
outputting from the lens a second clock signal to the camera body; and
performing second communication in which (i) first information indicating a position of the moving member and (ii) second information that can be used for calculation of a movement amount of the moving member are repeatedly transmitted from the lens to the camera body in synchronization with the second clock signal.

* * * * *